(12) United States Patent
Almblad

(10) Patent No.: US 11,344,153 B2
(45) Date of Patent: May 31, 2022

(54) VERTICAL COOKING SYSTEM

(71) Applicant: Robert Almblad, Lynchburg, VA (US)

(72) Inventor: Robert Almblad, Lynchburg, VA (US)

( * ) Notice: Subject to any disclaimer, the term of this patent is extended or adjusted under 35 U.S.C. 154(b) by 469 days.

(21) Appl. No.: 16/396,938

(22) Filed: Apr. 29, 2019

(65) Prior Publication Data

US 2019/0357726 A1 Nov. 28, 2019

Related U.S. Application Data

(60) Provisional application No. 62/638,231, filed on Mar. 4, 2018.

(51) Int. Cl.
- *A47J 37/06* (2006.01)
- *A47J 37/04* (2006.01)
- *G07F 11/68* (2006.01)

(52) U.S. Cl.
CPC ......... *A47J 37/0611* (2013.01); *A47J 37/045* (2013.01); *A47J 37/0688* (2013.01); *G07F 11/68* (2013.01)

(58) Field of Classification Search
CPC ............... A47J 37/0611; A47J 37/0688; A47J 2037/0617; G07F 11/66; G07F 11/68
USPC ................. 99/389, 390, 357; 221/30, 150 A
See application file for complete search history.

(56) References Cited

U.S. PATENT DOCUMENTS

| | | |
|---|---|---|
| 3,425,341 A | 2/1969 | McGinley |
| 4,185,546 A | 1/1980 | Karpisek |
| 4,444,094 A | 4/1984 | Baker et al. |
| 4,567,819 A | 2/1986 | Adamson |
| 5,006,358 A | 4/1991 | Rubio et al. |
| 5,113,754 A * | 5/1992 | Robinson ............. A47J 37/044 99/326 |
| 5,873,299 A * | 2/1999 | Leykin .................. G07F 9/105 99/357 |
| 5,931,083 A | 8/1999 | Stanger et al. |
| 6,244,019 B1 | 6/2001 | Ljungqvist et al. |
| 6,245,297 B1 | 6/2001 | Kowallis |
| 6,370,886 B1 | 4/2002 | Ochs |
| 6,802,433 B2 * | 10/2004 | Leykin .................. G07F 9/105 221/150 A |
| 8,359,970 B2 | 1/2013 | Calzada et al. |
| 8,367,977 B2 | 2/2013 | Lehman et al. |
| 8,822,886 B2 | 9/2014 | Lehman et al. |

(Continued)

FOREIGN PATENT DOCUMENTS

| | | | |
|---|---|---|---|
| WO | WO2006125058 | 11/2006 | |
| WO | WO2013117530 | 8/2013 | |
| WO | WO-2013117530 A1 * | 8/2013 | ......... B65D 75/5844 |

OTHER PUBLICATIONS

International Search Report for PCT/US2018/063955 dated Mar. 27, 2019.

(Continued)

*Primary Examiner* — Reginald Alexander
(74) *Attorney, Agent, or Firm* — Michael J. Nickerson; Basch & Nickerson LLP

(57) ABSTRACT

An automated vertical grill system includes a food storage unit having laminated food product therein; a food dispensing unit; a vertical grill; a conveyor; and a staging bin. The food dispensing unit includes a delamination trolley, which moves horizontally above the vertical grill and delaminates laminated food product into a cooking unit of the vertical grill.

8 Claims, 48 Drawing Sheets

(56) References Cited

U.S. PATENT DOCUMENTS

| | | |
|---|---|---|
| 9,301,646 B2 | 4/2016 | Rosa et al. |
| 9,861,229 B2 | 1/2018 | Lehman |
| 9,867,501 B2 | 1/2018 | Lehman |
| 2006/0261082 A1 | 11/2006 | Almblad et al. |
| 2006/0283153 A1 | 12/2006 | Nakano |
| 2012/0151882 A1 | 6/2012 | Nakano |
| 2014/0037828 A1 | 2/2014 | Kot |
| 2019/0059643 A1 | 2/2019 | Minard et al. |
| 2019/0104883 A1 | 4/2019 | Nelson |

OTHER PUBLICATIONS

Preliminary Report on Patentability for PCT/US2018/063955 dated Jun. 18, 2020.

* cited by examiner

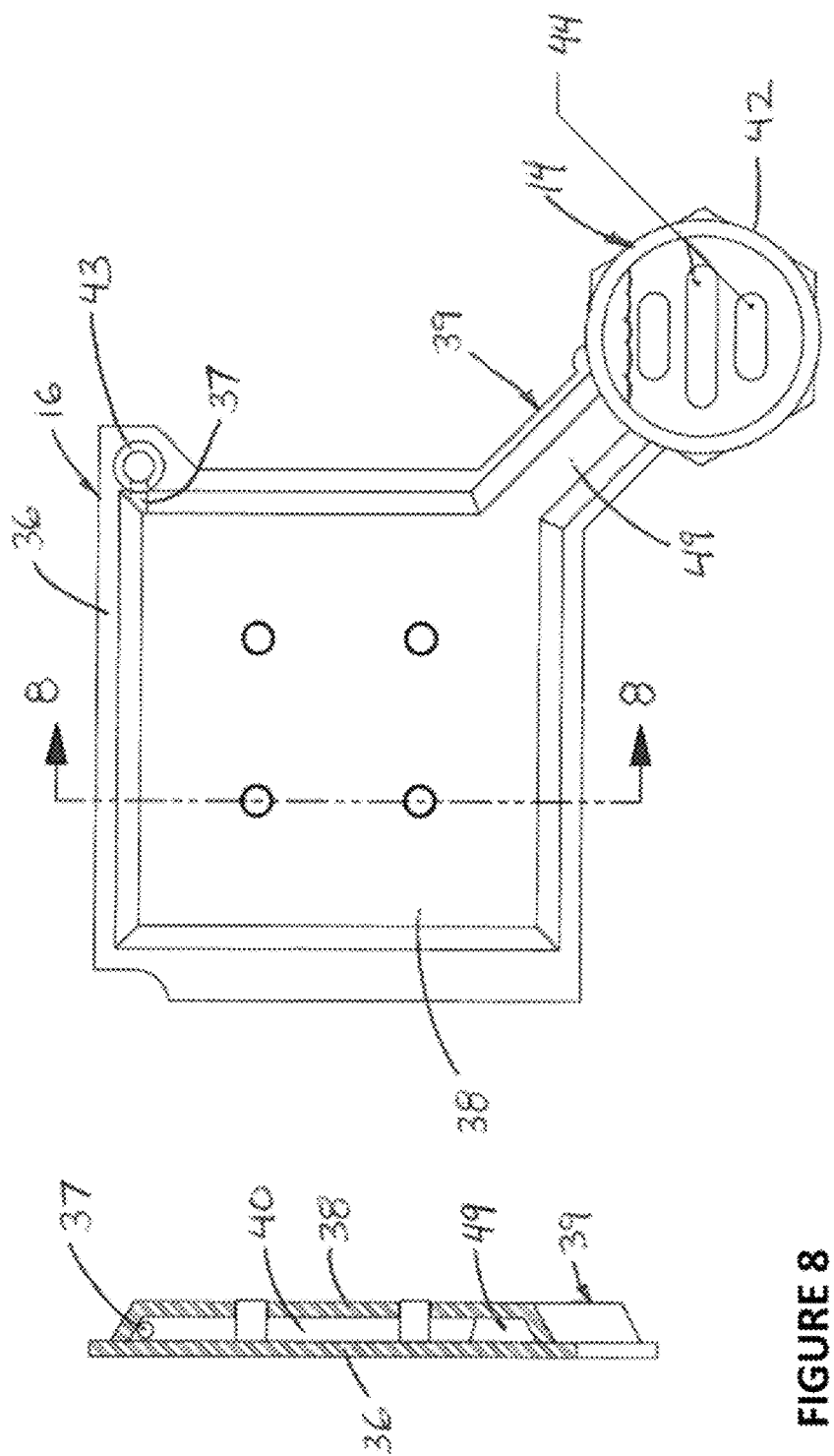

VERTICAL COOKING SYSTEM

PRIORITY INFORMATION

The present application claims priority, under 35 U.S.C. § 119(e), from U.S. Provisional Patent Application No. 62/638,231, filed on Mar. 4, 2018. The entire content of U.S. Provisional Patent Application No. 62/638,231, filed on Mar. 4, 2018, is hereby incorporated by reference.

BACKGROUND

Various types of cooking devices are known in the art. Specifically, various types of grills are known. In one type of grill, the food is placed on a grilling surface, grilling the side of the food that contacts the grilling surface. After that side of the food is cooked, the food is manually turned or flipped to cook the opposite side. After the second side of the food is cooked, the food is removed from the grill for further preparation and/or serving.

In another type of grill, two-sided cooking is accomplished simultaneously. Such grills are commonly known as clamshell grills and have upper and lower cooking platens that are horizontally opposed for contacting the two sides of a food item simultaneously to thereby cook both sides simultaneously.

For proper performance, the two grilling surfaces should be parallel to each other so that each surface uniformly contacts and cooks the associated side of the food item that contacts a respective platen cooking surface.

There is a large amount of activity in the general field of restaurant automation in context of hygienic handling of various food product(s), and several studies and researches as well as invention(s) have delved upon the subject(s) of 'packaging' and 'unpackaging' procedures/methods. Protocols such as lamination, sheet-layering, foil packaging and peeling off, dismantling and delamination, at the manufacture sites (food processing factories/units) and usage sites (restaurants, hotels and eating points) are known to be in existence in the prior art profile.

The prior art discloses patents on delamination of a laminate, use of conveyor belts to transport laminated food products from one place to other, as well as use of several methods for unpacking the laminated food products such as peeling of film, delamination of laminated food and also in some cases the deployment of stripper unit. However, the prior art profile does not eliminate the need of human interference such as the food product directly passed on to a cooking unit.

U.S. Pat. No. 5,141,584 discloses an apparatus and method for delaminating a composite sheet structure of the kind comprising a vertically frangible layer having a first surface adhesively bonded to a first sheet at a substantially uniform strength and an opposite surface abutting areas which are, respectively, adhesively bonded to a second sheet at strengths less or greater than the uniform strength and having a marginal portion or tab extending beyond the first sheet. The composite sheet structure is fed into the nip of upper and lower peel rollers and upon passage therethrough a strip sheet roller is rotated into position to bend and hold the laminate against the upper peel roller in a position to fracture the tab from the first sheet. On reversal of the feed direction and passage of the laminate back through the nip of the strip sheet and upper peel rollers, the thicker "keeper sheet" of the flexed laminate breaks from the "throw-away" sheet containing the tab at the preformed tab. A roller configuration and drive train structure are provided that provides a more predictable and repeatable steady state condition and allows for control of the location of the peel point to be accomplished.

Another conventional system is a method and device for packaging or unpackaging portions of a deep frozen food product. The invention provides details about how the process packs portions of—a low temperature foodstuff are first arranged with longitudinal separations in a row behind one another. The portions are guided between two strips of foil packaging which are then combined in order to form a ribbon. The portions may be placed in chambers in one of the strips, which are arranged along it with equal spacings. Each strip may also have half-chambers, and may be guided together in order to align corresponding half-chambers with each other prior to the introduction of a portion into one or both of them.

U.S. Pat. No. 6,244,019 discloses a system for packaging and unpackaging can lids. The system relates to packages for stacked can lids, a method of producing such packages, devices for implementing said method, devices for automated unpacking of the above nature and a system for packing and unpacking can lids. The packages are formed with an open end, which is closed in that the bag end, when in unfolded condition, is compressed and is provided with fastening means retaining said closed condition.

U.S. Pat. No. 8,367,977 discloses a compact portable heating device adapted to heat multiple food products simultaneously is provided. The heating device includes at least one heating element positioned opposite at least one other heating element to form a slot between heating surfaces of the elements for receiving food product. One heating element is mounted to move linearly along a longitudinal axis substantially perpendicular to the heating surfaces. The entire content of U.S. Pat. No. 8,367,977 is hereby incorporated by reference.

U.S. Pat. No. 8,822,886 discloses a compact portable heating device adapted to heat multiple food products simultaneously is provided. The heating device includes at least one heating element positioned opposite at least one other heating element to form a slot between heating surfaces of the elements for receiving food product. One heating element is mounted to move linearly along a longitudinal axis substantially perpendicular to the heating surfaces. The entire content of U.S. Pat. No. 8,822,886 is hereby incorporated by reference.

U.S. Pat. No. 9,861,229 discloses a movable door that directs debris, such as oil, grease, and food particles, that falls from a plurality of cooking slots in a vertical cooking grill to an area separate from a food product delivery tray, providing a cooked food product with reduced calories that is potentially more visually appealing. The entire content of U.S. Pat. No. 9,861,229 is hereby incorporated by reference.

U.S. Pat. No. 9,867,501 discloses a food loading system provides the ability to stage a volume of food in a freezer or cooler that keeps food product safely stored until the product is ready to be transferred to a cooking unit. The food loading system is configured to deliver the food product directly from storage to a loading mechanism for a cooking unit or directly to a cooking unit. The food loading system includes a control panel that accepts operator inputs for transfer of food from storage, or the food loading system may be connected wirelessly or by wire to one or more Point-Of-Sale (POS) devices, such as tablets, cash registers, and the like, and the food loading system uses the input from the POS devices to transfer food automatically from storage to a cooking unit input or directly to a cooking unit. The entire content of U.S. Pat. No. 9,867,501 is hereby incorporated by reference.

In addition, the closing device closes the open package end by compressing the bag end in the unfolding condition and in that fastening means are applied retaining said dosed condition, and the unpacking device causes relative movement of the packages and the can lids contained therein in such a manner that the can lids are pressed against the package end closed by means of said fastening means.

The features of the afore-mentioned prior art disclose complex design and bulky structural indices thereby hindering utilization in restaurant automation devices.

Moreover, the afore-mentioned prior art fails to address the use of restaurant automation in highly aseptic conditions by eliminating human interference during transfer of food products from refrigerated storage to cooking unit.

Therefore, it is desirable to provide a system that enables the automation of a meat cooking apparatus which minimizes human interaction and provides an efficient and consistent cooking process.

In addition, it is desirable to provide a system that enables the automation of a meat cooking apparatus that enables the independent loading of individual grilling slots with uncooked product.

Furthermore, it is desirable to provide a system that enables the automation of a meat cooking apparatus that enables independent cooking of product by individual grilling slots.

Also, it is desirable to provide a system that enables the automation of a meat cooking apparatus that enables the independent loading of individual grilling slots with uncooked product and enables independent cooking of product by individual grilling slots.

BRIEF DESCRIPTION OF THE DRAWING

The drawings are only for purposes of illustrating various embodiments and are not to be construed as limiting, wherein:

FIG. 7 is an end view of one heating element connected to a steam generator;

FIG. 8 is a cross-sectional view of the heating element taken along plane 8-8 in FIG. 8;

DETAILED DESCRIPTION OF THE DRAWINGS

Figure 1:
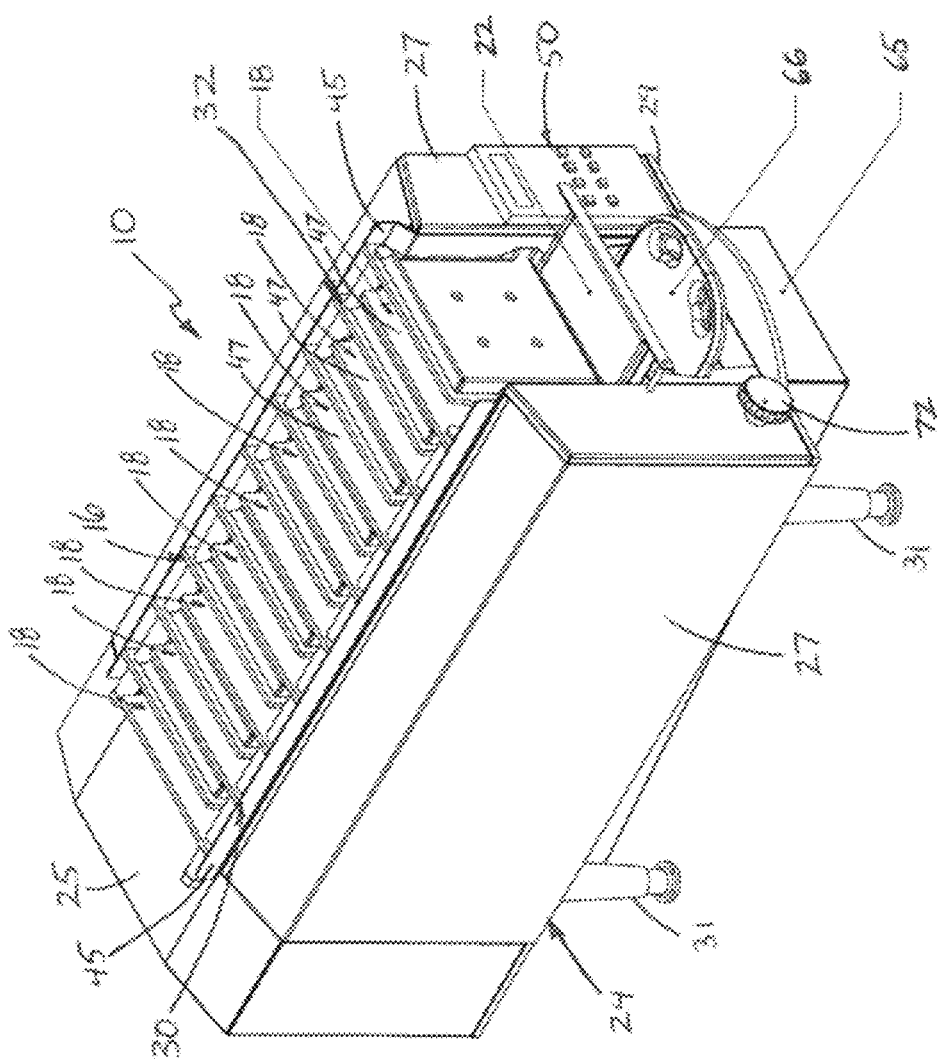
FIG. 1 is a perspective view of an exemplary embodiment of the heating device of a conventional vertical grill.
Figure 2:
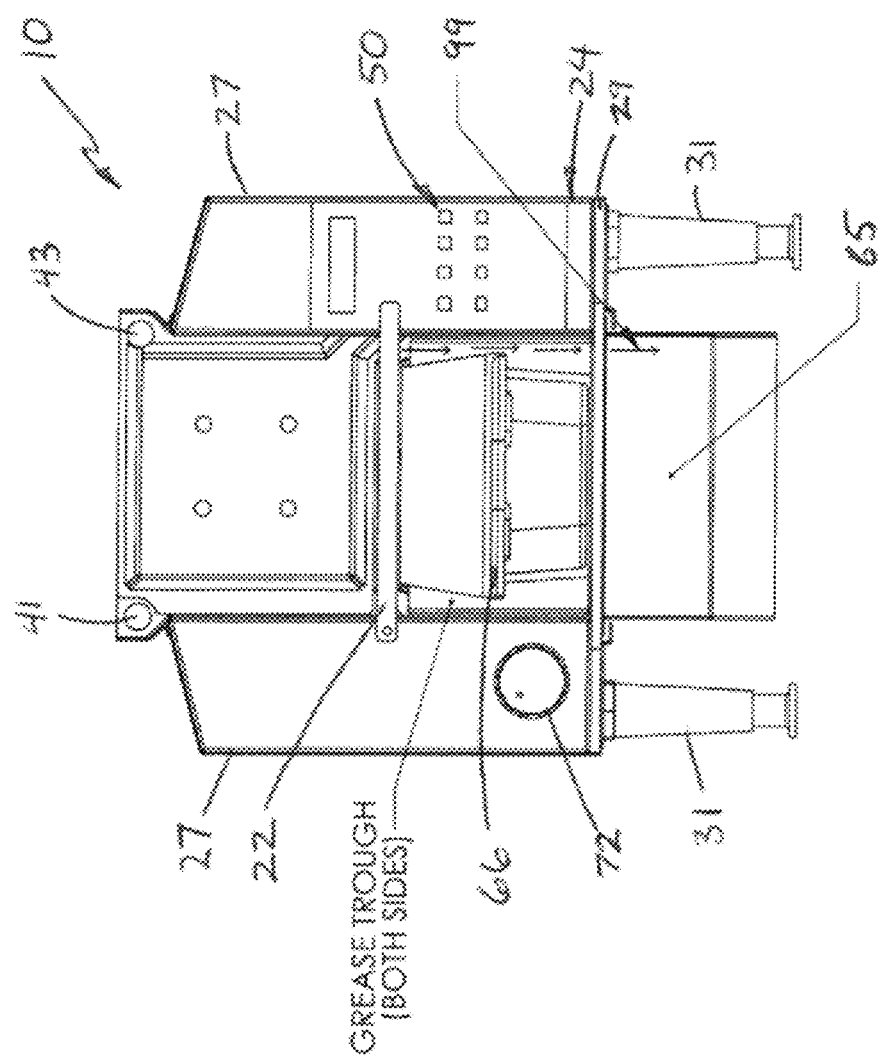
FIG. 2 is a front end view of the device of FIG. 1.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Figure 11:
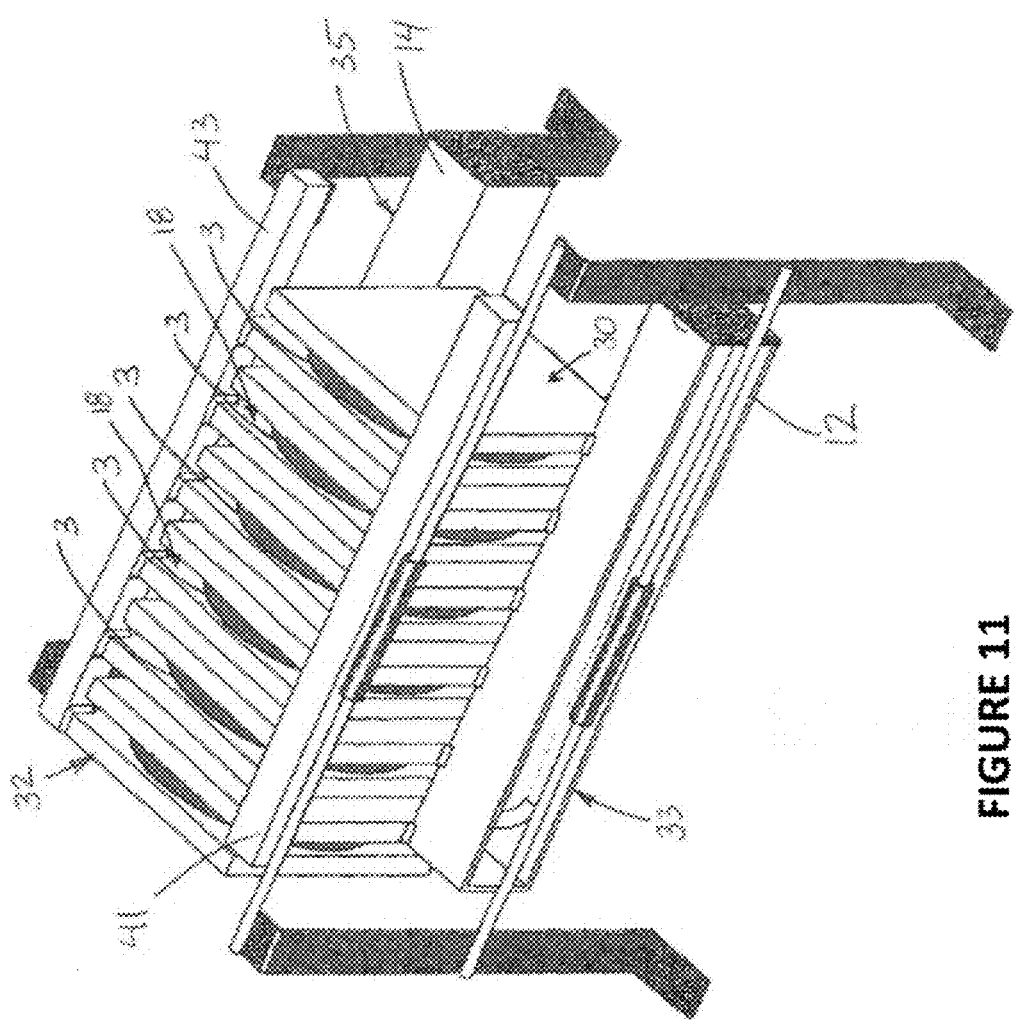
FIG. 11 is a conceptual perspective view of an exemplary embodiment of a conventional vertical grill.

Referring to FIGS. 1-6, an exemplary embodiment of a conventional food product heating device 10 includes one or more heat generators 12 and 14, multiple heating elements 16 positioned adjacent one another to create at least one heating slot 18 for receiving a food product 3 (FIG. 11), a movable product door 22 for supporting and controlling the position of the food product, and a housing 24. The device 10 heats and/or cooks multiple food products, such hamburgers, chicken cutlets, fish patties, vegetable burgers, or any other food product capable of being positioned in slot 18 by simultaneously applying heat to both sides of each food product.

Heating device 10 is effective in heating and/or cooking raw food products, whether frozen or not, and food products that have been previously cooked and require reheating. Heating device 10 is a small, compact, and portable unit that uses vertical space thereby occupying a minimum amount of horizontal space, e.g. counter area, and maximizing the ratio of food product heated per square foot of horizontal space occupied by the device.

As shown in the FIG. 1 and FIGS. 3-5, multiple heating elements 16 include a first set or array of heating elements 30 and a second set or array of heating elements 32. First set and second set of heating elements 30 and 32, respectively, are be connected to a first and a second heat generator 12 and 14, respectively, at one lower corner of heating elements 30 and 32 to form a first heating assembly 33 and a second heating assembly 35, respectively. In this manner, each heat generator provides physical support to the respective set of heating elements First heating assembly 33, comprising first set of heating elements 30 and first heat generator 12, is movably mounted for sliding movement along longitudinal axis 2 of device 10 on linear bearings 34 mounted inside housing 24. It is noted that the first set of heating elements 30 do not move independent of each other, but are tied together to move together.

The second heating assembly 35, comprising second set of heating elements 32 and second heat generator 14, is stationary and fixedly mounted to housing 24. Housing 24 may include a rear section 25, side sections 27, a lower base 29, legs 31, and grease walls 45.

First set of heating elements 30 are meshed with second set of heating elements 32 so as to overlap and alternate along the longitudinal axis 2 of the device to form pairs of heating elements where each pair forms a heating slot 18 and includes one heating element from first set of heating elements 30 and one heating element from second set of heating elements 32.

Once uncooked food product is loaded or inserted into slots 18, first heat assembly 33 is moved or shifted linearly and axially along the longitudinal axis 2 causing all the first set of heating elements 30 to move closer to second set of heating elements 32 to contact the food product and enable heating.

Each heating element 16 of the first and second set of heating elements 30, and 32 include a platen or plate 36 and a back portion 38 connected to or formed on plate 36 to create an inner chamber 40. The chamber 40 is capable of withstanding a maximum internal pressure of, for example, 250 psi.

Each plate 36 includes a generally flat or planar heating surface 47 so that the opposing flat heating surfaces of adjacent plates 36 are positioned adjacent and generally parallel to one another to partially form slots 18.

The plates 36 are spaced in the loading position to form slots 18 of a sufficient size (width) to receive a food product of a particular size between heating elements 16 for heating on both sides of the food product simultaneously by direct contact with opposite plates 36. Back portions 38 are connected to respective plates 36 by welding. Each plate 36 and back portion 38 include an extension section 39 with a connection chamber 49 positioned at one corner and extending to fluidly connect with respective heat generators 12 and 14. The extension section 39 extends through, and is connected to, the respective grease wall 45. The grease wall 45, on the side of the device having the first heating assembly 33, moves with the first heating assembly.

Each heating element 16 is positioned so that the opposing heating surfaces 47 extend transverse to the horizontal support surface supporting the device. Heating surfaces 47 are positioned substantially vertical so that slots 18 are also positioned substantially vertical, and in series along the longitudinal axis 2 of device 10.

As a result, slots 18, and heating surfaces 47, are positioned substantially perpendicular to the longitudinal axis 2 of device 10, and any generally flat surface on which the device 10 is supported.

The width of slots 18 can be adjusted to accommodate different sized food product using an adjustment mechanism 70 to permit selective adjustment of the extent of the linear movement of first heating assembly 33. An adjustment stop mechanism 70 includes a knob 72, a rotatable shaft 74 connected to the knob at one end, and a stop wheel 76 connected to an opposite end of shaft 74. Stop wheel 76 includes a plurality of stops or protrusions 78 extending axially from, and positioned annularly around, one side of stop wheel 76 for contact by a bracket 80 fixedly attached to movable first heating assembly 33.

Each of protrusions 78 extend from stop wheel 76 a different distance to create a different axial ending position of the first heating assembly 33 in the heating position. A user rotates knob 72 to a position to create a particular stop position corresponding to a desired heating slot width.

A bias spring 82 is mounted between a portion of housing 24 and bracket 80 to bias bracket 80 and thus first heating assembly 33 toward the heating position as limited by an aligned protrusion 78. Adjustment stop mechanism 70 may be a manual or automated device including mechanical and/or electronic device capable of providing a limit to the axial position of the assembly 33.

First and second support manifolds 41 and 43 extend along the top of a respective set of plates 36 associated with first and second heating elements 30 and 32, respectively. Manifolds 41 and 43 are hollow tubes that connect the chambers 40 of the respective set of heating elements associated with the respective heating assemblies 33 and 35.

As shown in FIG. 7, the steam from one chamber is fluidly connected to the respective manifold via a branch passage 37 and thus connected to all other chambers of the heating elements in the respective first or second set of heating elements. Since the manifolds are positioned at or near a high point in the system, each manifold 41 and 43 includes a removable end cap that can be used to bleed air from the system and to add condensate to the system.

All chambers 40 of first set of heating elements 30 are commonly connected to both heat generator 12 and manifold 41 and also interconnected to one another via manifold 41 via branch passages 37, while all chambers 40 of second set of heating elements 30 are commonly connected to heat generator 14 and manifold 43 and also interconnected via manifold 43 and respective branch passages 37.

Each heat generator 12 and 14 may be a steam generator capable of containing a condensate/liquid, such as water, and generating steam. Each heat generator 12 and 14 may include condensate housing or manifold 42 and a heater 44, such as an electric heater, positioned inside condensate housing 42 for heating the condensate.

Steam generated in each housing 42 flows upwardly into the various respective chambers 40 of the respective set of heating elements 30 and 32, thereby providing heat to plates 36. The steam provides heat to plates 36 and the food product, causing the steam to condense to a liquid which then drains back to housing 42.

Heating device 10 includes a product door 22 slidably mounted on housing 24 below first and second heating elements 30 and 32 for shifting/sliding movement between a support position shown in FIG. 3 and a drop position shown in FIG. 4.

Figure 9:
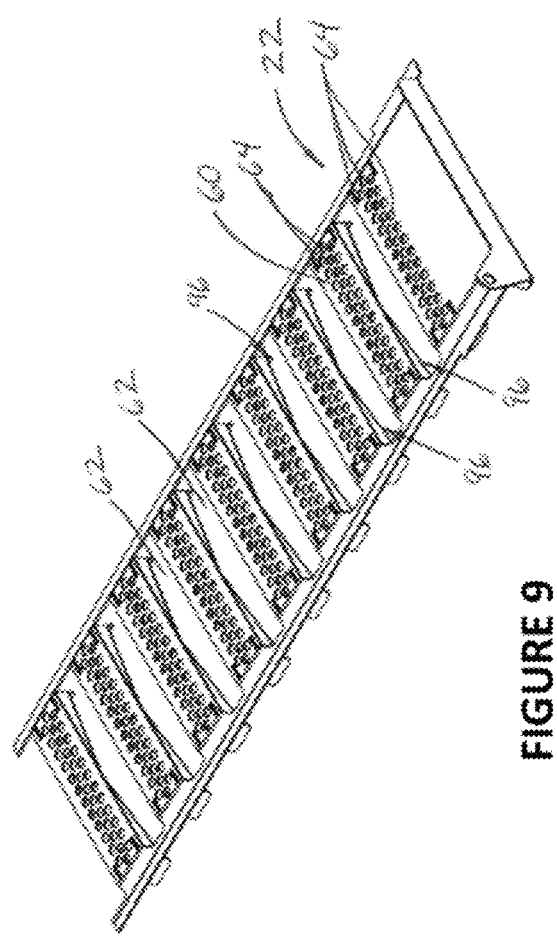
FIG. 9 is a perspective view of the product door of the heating device of FIG. 5.
Figure 10:
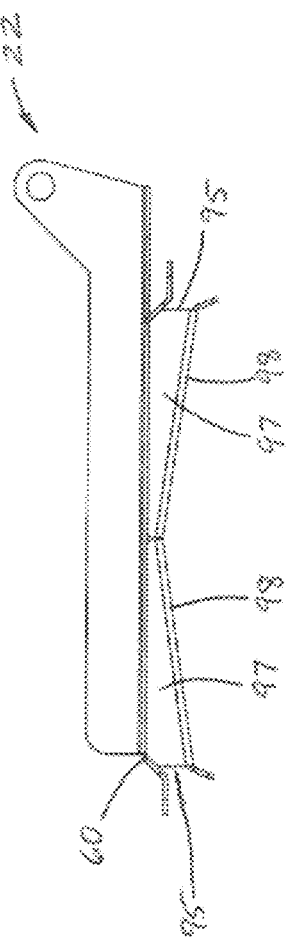
FIG. 10 is an end view of the product door of FIG. 9.

Referring to FIGS. 9 and 10, product door 22 includes a top surface 60 and a series of elongated exit openings 62 intermittently spaced along the longitudinal extend of door 22 and extending through top surface 60 for allowing food product to fall from slots 18. Product door 22 also includes a series of drain holes 64 extending through top surface 60 and positioned in alternating fashion with exit openings 62 along the longitudinal axis of device 10 for permitting fluid run-off, such as grease, from the food product to flow from the slots 18 to a grease pan 65.

Product door 22 also includes a series of grease baffles 96 positioned under the drain holes 64 and between exit openings 62. Each grease baffle 96 includes side walls 97, and a bottom wall 98 having a middle portion close to the top surface 60 and sloping downwardly and transversely away from the top surface 60 on each side before terminating to form an opening 95 on each side for fluid flow. Fluids, such as water and grease, flowing through drain holes 64 is captured by each baffle 96 and directed transversely outwardly to the opening 95 at each side.

The fluid then falls by gravity downwardly through a grease path 99 formed on both sides of the removable product tray 66 between the tray and grease walls 45, thereby advantageously avoiding collection in tray 66 and contact with any food product.

Figure 3:
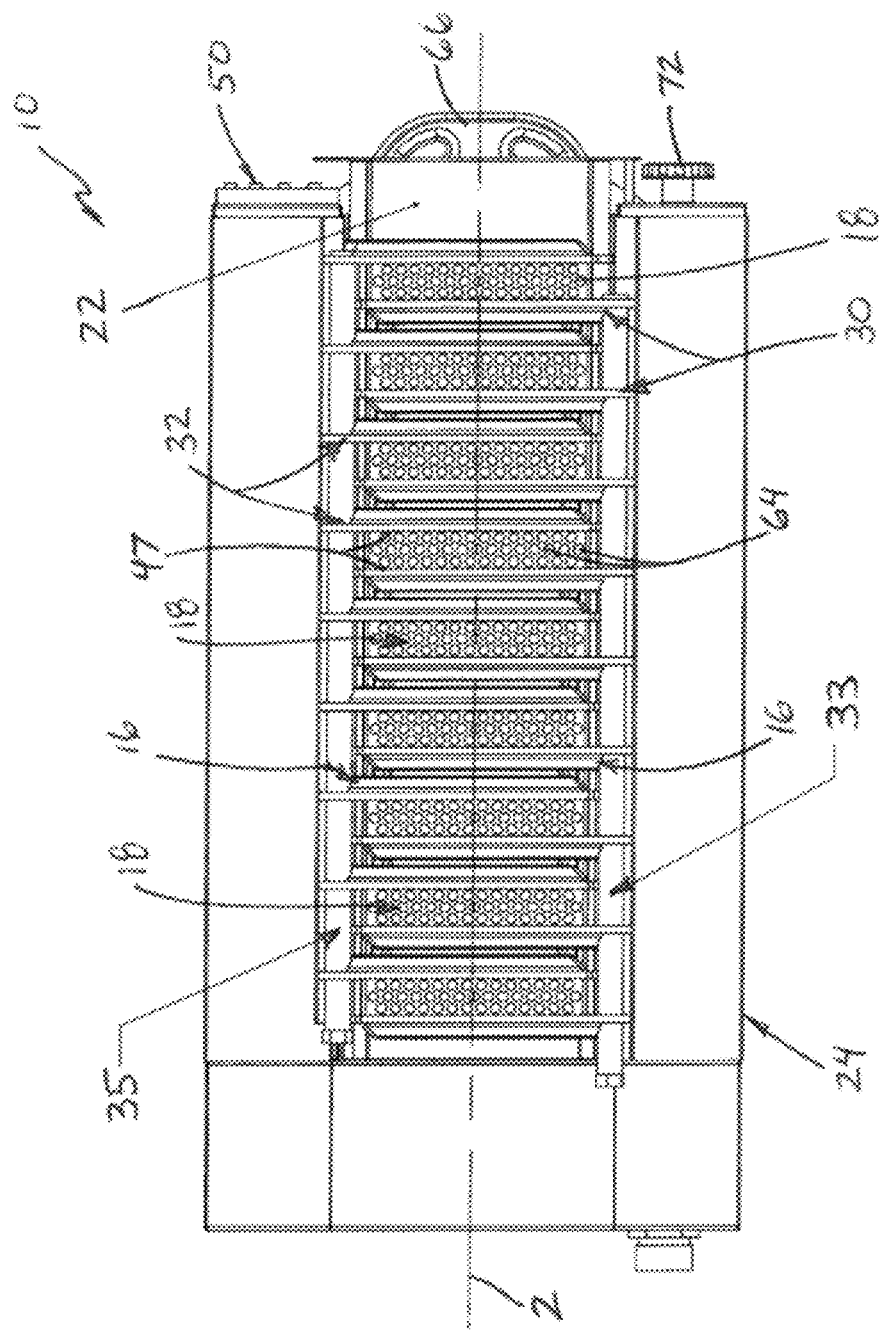
FIG. 3 is a top view of the device of FIG. 1 with the product door in the support position.

As shown in FIG. 3, in the support position, with product door 22 pushed inwardly, drain holes 64 are aligned with slots 18 to allow product door 22 to support a food product during insertion and heating of the food product while permitting fluids, such as grease, to flow out of slots 18 to grease pan 65. In the support position, exit openings 62 are positioned out of alignment with slots 18 and directly under a heating element.

Figure 4:
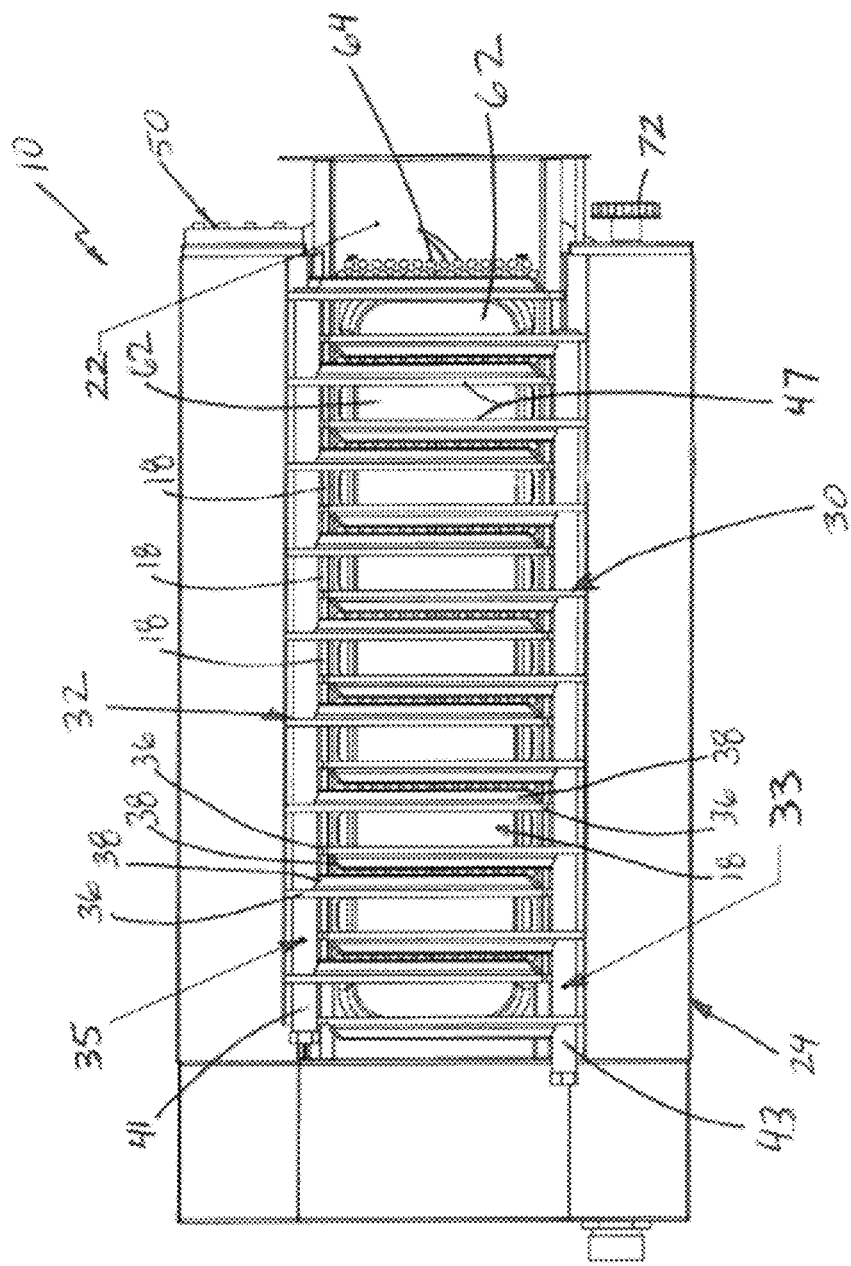
FIG. 4 is a top view of the device of FIG. 1 with the product door in the drop position.

As shown in FIG. 4, in the drop position, with product door 22 pulled outwardly, drain holes 64 are moved out of alignment with respective slots 18 and exit openings 62 are each positioned in alignment with slots 18 to cause the heated/cooked food product to fall by gravity onto a receiving tray 66 for removal by sliding tray 66 outwardly.

Figure 5:
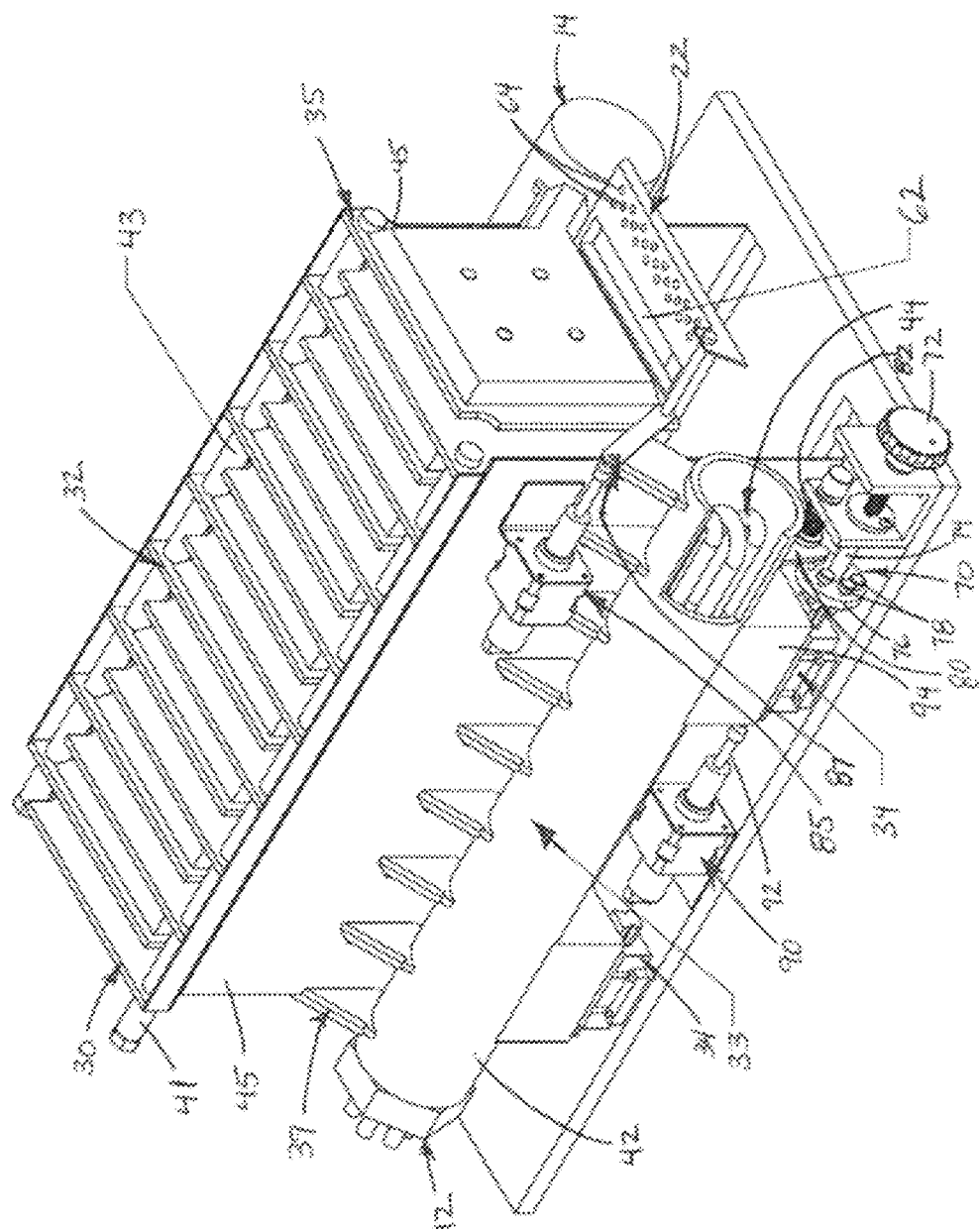
FIG. 5 is a perspective view of the device of FIG. 1 with the housing removed.
Figure 6:
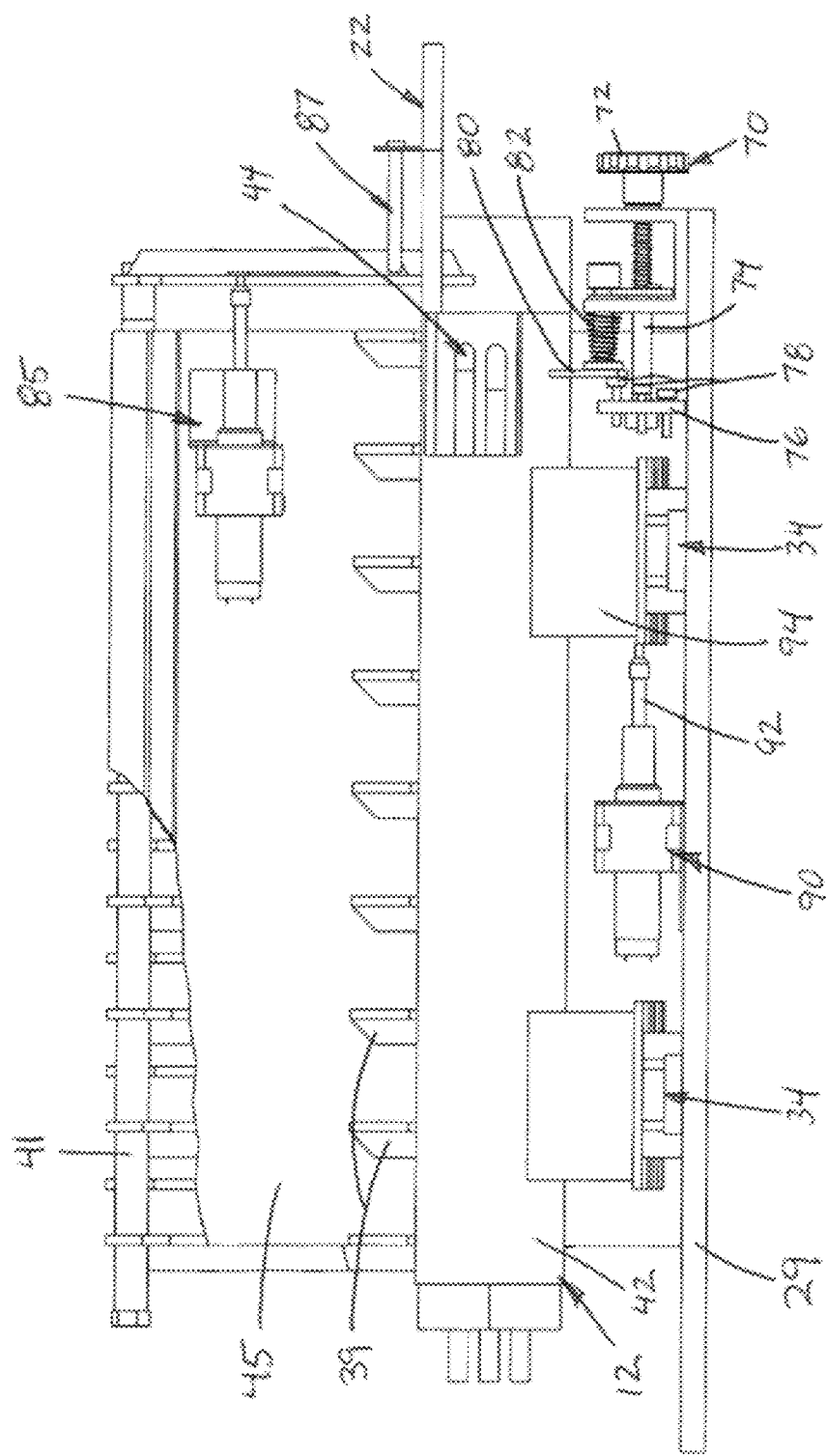
FIG. 6 is a side view of the device of FIG. 5.

Referring to FIGS. 5 and 6, first heating assembly 33 may be mounted and arranged to be moved manually along linear bearings 34 by a user or, preferably, automatically moved by operation of a linear actuator 90, such as an electric motor and drive assembly, such as a screw type drive, or a solenoid actuator. Spring 82 is compressed when first heating assembly 33 is moved by an automatic actuator, i.e. linear actuator 34, away from the heating elements of the other heating assembly 35 into a loading position. A shaft 92 of linear actuator 34 abuts a lower portion of a generator support 94. Then, upon deactivation of linear actuator 34, and reverse movement of the shaft 92 of linear actuator 34, first heating assembly 33 is moved back into the heating position against the food product by spring 82.

Electronic controls 50 may be provided for on/off control of heaters 44 together or independently, automatic operation of the linear actuator 90 to control axial movement of heating assembly 33, and automatic operation of product door 22. All functions needed to complete a heating cycle are preprogrammed in the electronic controls 50 and initiated by activation of a single button by a user.

During operation, the unit is turned on to cause the heater to begin heating the condensate. An indicator, such as a light, may be provided to indicate when the unit has reached a predetermined temperature and is ready for heating operation. A user may initiate the unit by activating a load button to cause the automatic controls to move the first heating assembly into the loading position and the product door to move into the support position. Food product is then placed in slots and the cycle can continue by, for example, the user actuating another switch to initiate a heating cycle, such as selecting a preset heating or cook time. The cycle may include the linear/axial shifting or sliding movement of first heating assembly toward second set of heating elements to contact the food product, preferably on both sides.

After a desired period of time determined by the user manually or by the preset automatic control, product door is automatically moved into the drop position and then the first heating assembly is moved linearly/axially away from second set of heating elements and away from the food product allowing the food to drop by gravity onto receiving tray for removal by a user.

An example of a vertical cooking grill is disclosed in U.S. Pat. No. 8,397,977. The entire content of U.S. Pat. No. 8,397,977 is hereby incorporated by reference.

Another example of a vertical cooking grill is disclosed in U.S. Pat. No. 8,822,886. The entire content of U.S. Pat. No. 8,822,886 is hereby incorporated by reference.

An example of a movable door for a vertical cooking grill is disclosed in U.S. Pat. No. 9,861,229. The entire content of U.S. Pat. No. 9,861,229 is hereby incorporated by reference.

Figure 12:
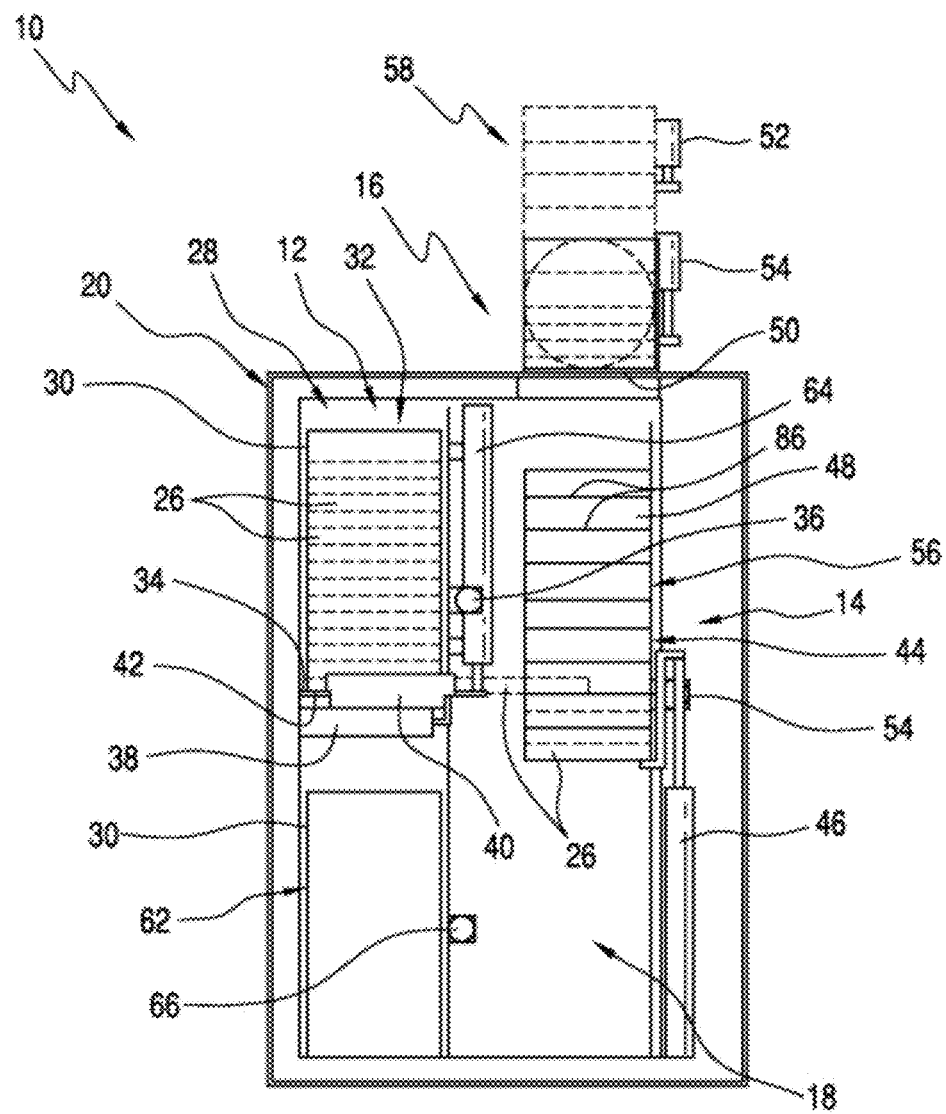
FIG. 12 is a front view of a conventional automatic food loading system in accordance with an exemplary embodiment of the present disclosure, along the lines 1-1 in FIG. 14.
Figure 13:
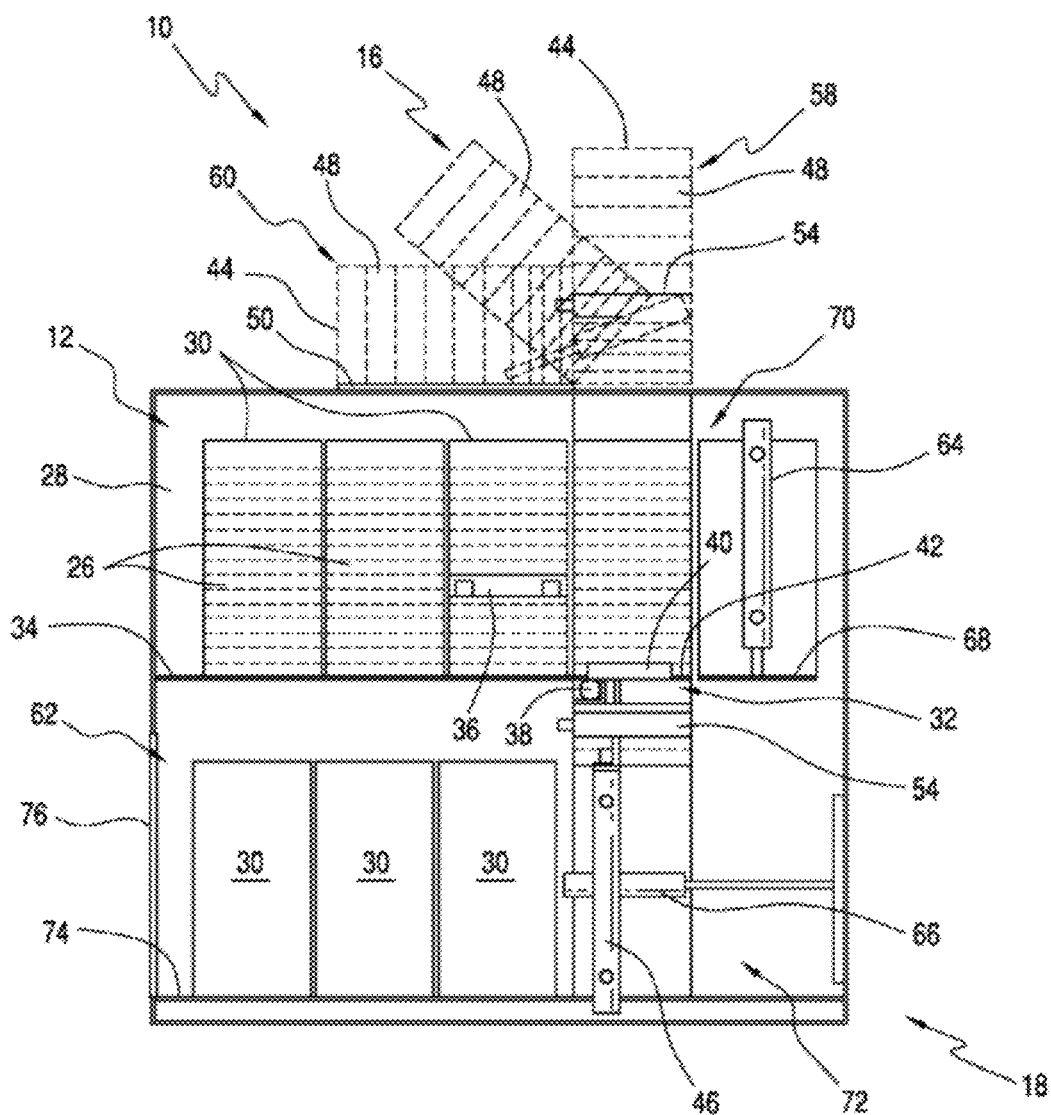
FIG. 13 is a side view of the conventional automatic food loading system of FIG. 12 along the lines 2-2 in FIG. 14.
Figure 14:
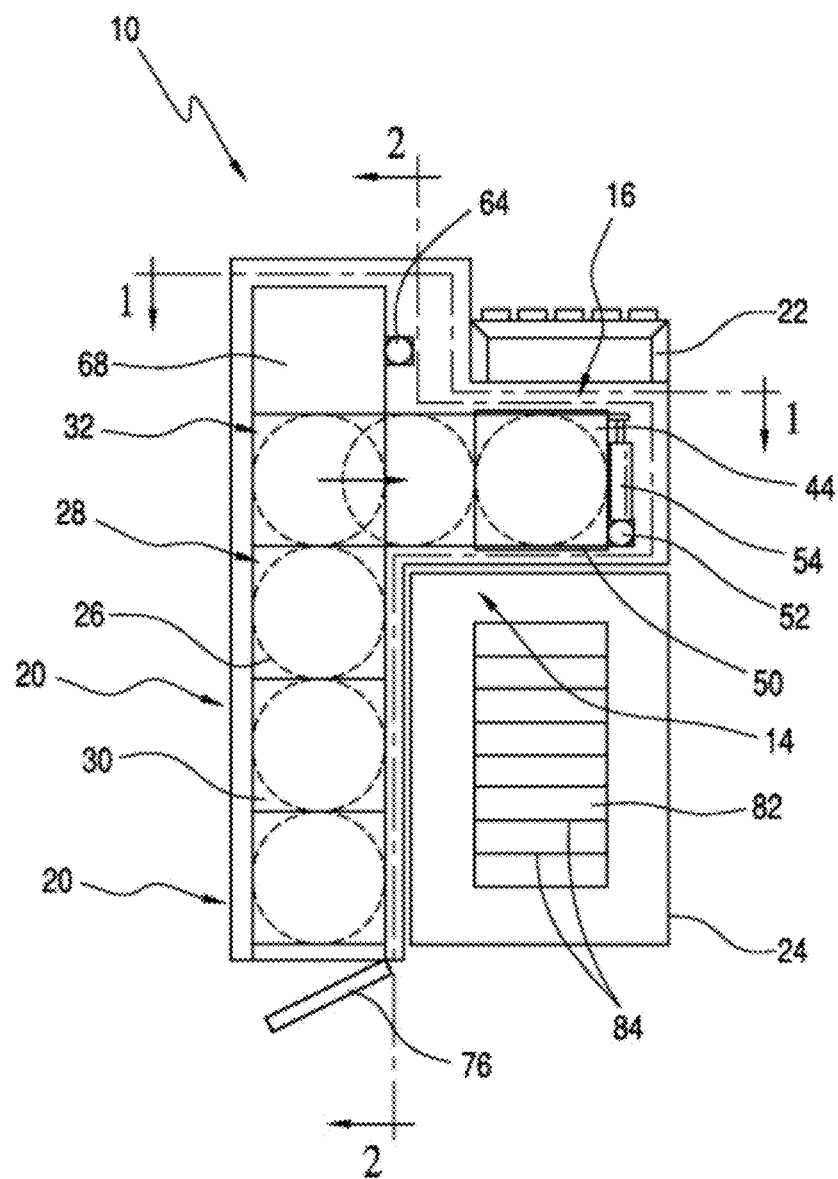
FIG. 14 is a top view of the conventional automatic food loading system of FIG. 12 and a conventional vertical grill.

Referring to FIGS. 12-14, a conventional automatic food product loading system or food loading system 10 is shown. The conventional food loading system 10 provides the ability to stage a volume of food in a freezer that keeps food product safely stored until the product is ready to be transferred to a cooking surface of a cooking unit.

The conventional food loading system 10 also delivers food product directly from storage to a loading mechanism for a cooking unit or directly to a cooking unit. The conventional food loading system 10 includes a control panel that accepts operator inputs for transfer of food from storage.

The conventional food loading system 10 includes a storage system 12, a food transfer system 14, a loader system 16, and a cartridge holding system 18. Storage system 12 holds filled food cartridges, food transfer system 14 moves a food product 26 from food cartridges to loader system 16, and cartridge holding system 18 moves empty cartridges into a holding area or portion.

Conventional food loading system 10 also includes a freezer or cooler system 20 in which storage system 12, food transfer system 14, loader system 16, and cartridge holding system 18 are at least partially positioned, and a control system 22 that determines the quantity of food product 26 to be moved from storage system 12 to loader system 16 for movement to a cooking unit, such as a vertical grill 24, shown in FIG. 14.

Frozen or cooled food product 26 is kept in storage system 12 until control system 22 enters a quantity of food product 26 to be transferred from storage system 12 to loader system 16. Food product 26 is positioned to permit food transfer system 14 to move food product 26 from storage system 12 to loader system 16. Once a cartridge of storage system 12 is emptied, which is tracked by control system 22, the empty cartridge is moved to a position where cartridge holding system 18 is able to move the empty cartridge to an empty cartridge holding location within food loading system 10.

Food product 26 within loader system 16 moves from an interior of freezer or cooler system 20 to an exterior of system 20 for transfer from loader system 16 to an input of a cooking unit, such as vertical grill 24. The food product 26 is transferred directly from loader system 16 into a plurality of vertically oriented heating or cooking slots 82 positioned in a side-by-side configuration in vertical grill 24, such that at least one heating surface 84 is positioned between each adjacent pair of cooking slots 82.

Storage system 12 includes a staging compartment 28 positioned in freezer system 20. Staging compartment 28 is configured to hold a plurality of food storage containers or cartridges 30. Each cartridge 30 is capable of holding a plurality of food products 26. Each cartridge 30 engages with an adjacent cartridge 30, so that movement of one cartridge 30 moves all cartridges 30, or, alternatively, cartridges 30 are loaded onto a conveyor for moving cartridges 30 to a transfer position 32.

A staging compartment 28 includes a horizontal or transverse staging compartment platform 34 that is planar and has a relatively low coefficient of friction with respect to cartridges 30 to permit cartridges 30 to slide relatively easily in a horizontal or transverse direction along staging compartment platform 34 into transfer position 32. Movement of cartridges 30 from staging compartment 28 to transfer position 32 may be accomplished by a loaded cartridge advance cylinder 36, which engages a portion of cartridge 30 to move cartridge 30 horizontally or transversely from staging compartment 28 into transfer position 32.

When loaded cartridge advance cylinder 36 retracts, cylinder 36 moves away from an advance cylinder engaging feature on cartridge 30 in transfer position 32 to a location in proximity to an advance cylinder engaging feature on the next cartridge 30 in staging compartment 28.

Cartridges 30 may be loaded with a predetermined number of food products 26, or with a volume of food product 26 that is entered into control system 22, or a sensor (not shown) positioned adjacent to transfer position 32 may indicate the status of food product 26 in cartridge 30 at transfer position 32.

Loaded cartridges 30 are positioned in staging compartment 28 by an operator and, in the exemplary embodiment, engaged to each other so that movement of a loaded cartridge 30 from staging compartment 28 to transfer position 32 causes any other loaded cartridges 30 in staging compartment 28 to be moved horizontally or transversely toward transfer position 32.

Food transfer system 14 includes transfer position 32, a transfer cylinder 38, and a transfer device 40. Control system 22 determines the quantity of food product necessary to be cooked. Control system 22 commands transfer cylinder 38 to move the required number of food products 26 from cartridges 30 into loader system 16.

Transfer cylinder 38 engages transfer device 40, which moves individual food products 26 from an end of cartridge 30 into loader system 16, such as an upper or top end or a lower or bottom end. Food products 26, which are preferably frozen to withstand the rigors of movement and contact with adjacent food product 26, are moved from the bottom or lower end of cartridge 30 into loader system 16.

Alternatively, food products 26 are moved from a top end portion of cartridge 30 into loader system 16. Transfer device 40 includes a kick-out mechanism to move transfer device 40 away from cartridge 30 during retraction of transfer cylinder 38 to prevent moving or damaging the next food product 26 in cartridge 30.

Subsequently, transfer device 40 moves into cartridge 30 to a position where transfer device 40 is able to move another food product 26. Because cartridge 30 extends in a vertical direction, and because food product 26 is stacked vertically within cartridge 30, the movement of one food product 26 from cartridge 30 to loader system 16 causes all remaining food product 26 in cartridge 30 to drop vertically or downwardly toward a bottom 42 of cartridge 30. Once cartridge 30 is empty, cartridge 30 is advanced transversely or horizontally into cartridge holding system 18, which moves empty cartridge 30 into an empty cartridge holding area.

Loader system 16 includes a columnar loader unit 44 and a loader cylinder 46. Loader cylinder 46 is configured to position loader unit 44 in a plurality of positions that extend in a vertical or up and down direction. Loader unit 44 includes a plurality of loader unit slots, load unit slots, load slots, or load unit pockets 48 formed by a plurality of walls 86, with each wall 86 configured to be approximately parallel to adjacent walls 86, and a spaced distance from at least one other adjacent wall 86 (since the end wall will be adjacent only to one wall).

Loader cylinder 46 moves loader unit 44 vertically in a plurality of loading positions 56 so that food transfer system 14 is able to transfer one food product 26 from cartridge 30 into each loader unit slot 48. Cartridge 30 is moved to a plurality of positions that permit transfer of food product 26 to each empty loader unit slot 48. Loader unit 44 also includes a loader unit door 50, a loader door cylinder 52, and a loader tilt cylinder 54

Loader unit door 50 covers two adjacent sides of loader unit 44, with each side including a plurality of door openings (not shown) that permit food product 26 to be moved into loader unit slots 48 and permit food product 26 to exit loader unit 44. After loader unit 44 contains the amount of food product 26 requested by control system 22, which may be one food product 26 to each loader unit slots 48 located in loader unit 44, loader door cylinder 52 is actuated by control system 22, moving loader unit door 50 vertically from a position that permits food to be loaded into loader unit slots 48 to a position that closes or covers loader unit slots 48. Loader unit door 50 covers two sides of loader unit 44, which keeps food product 26 positioned in loader unit slots 48 during a tilting operation.

Once loader unit door 50 is in a closed position, loader cylinder 46 lifts loader unit 44 vertically from loading position 56 through a top of freezer 20 to an extended position 58, shown in phantom lines in FIGS. 12 and 13. Once in extended position 58, loader tilt cylinder 54 extends, causing loader unit 44 to tilt approximately 90 degrees from vertical extended position 58 to a horizontal delivery position 60. Horizontal delivery position 60 positions loader unit slots 48 directly above either a food cooking unit, such as vertical grill 24, or above a conveyor or other loader (not shown) that transports food to a food cooking unit (not shown).

After loader unit 44 reaches delivery position 60, control system 22 transmits a signal to loader door cylinder 52 to move loader unit door 50 from a closed position to an open position, permitting food product 26 to release and drop under the force of gravity from loader unit slots 48 into vertically oriented cooking slots 82 in vertical grill 24 or onto a conveyor or other food transport device. Because loader unit 44 was moved from a vertical orientation to a horizontal or transverse orientation by the action of loader tilt cylinder 54, the movement of loader unit door 50 in the delivery position is horizontal or transverse to the vertical direction. The time required for food product 26 to drop from loader unit slots 48 is significantly less than one second, so after a predetermined time interval, which may be one or two seconds, control system 22 transmits a signal to loader tilt cylinder 54 to move loader unit 44 from delivery position 60 to extended position 58.

Loader cylinder 46 then moves loader unit 44 from extended position 58 to one of the plurality of loading positions 56. During movement of loader unit 44 from delivery position 60 to loading position 56, loader unit door 50 may remain open since food product no longer needs retained in loader unit slots 48.

Once one cartridge 30 in transfer position 30 is empty, cartridge 30 needs moved to make room for another cartridge 30 containing food product 26. When loaded cartridge advance cylinder 36 moves a full cartridge 30 to transfer position 32, if an empty cartridge 30 is in transfer position 32, it is moved horizontally or transversely from transfer position 32 to a platform 68, which is part of cartridge holding system 18. Cartridge holding system 18 further includes a vertically oriented lowering cylinder 64 and an empty cartridge advance cylinder 66.

When control system 22 determines that an empty cartridge 30 has been moved to platform 68 by the action of loaded cartridge advance cylinder 36, control system 22 next sends a signal to lowering cylinder 64 to move platform 68 vertically from an upper portion 70 of freezer 20 to a lower portion 72 of freezer 20. Because the engagement of cartridge 30 with an adjacent cartridge 30 permits cartridge 30 to move freely in a downward direction, an empty cartridge 30 readily disengages from a horizontally or transversely adjacent full cartridge 30 as empty cartridge 30 travels on platform 68 from upper portion 70 to lower portion 72.

Once platform 68 is directly adjacent to a lower portion platform 74 of freezer 20, in an empty cartridge holding location 62 of freezer system 20 so that a top surface of platform 68 is even with or slightly higher than a top surface of lower portion platform 74, control system 22 transmits a control signal to empty cartridge advance cylinder 66 to actuate, which pushes an empty cartridge 30 from platform 68 onto lower portion platform 74, the surface of which has a sufficiently low coefficient of friction to permit horizontal or transverse sliding movement of empty cartridges 30. Freezer or cooler system 20 includes an access door 76 that permits an operator access to the interior of freezer or cooler system 20 to be able to load full cartridges 30 onto staging compartment platform 34 and to remove empty cartridges from lower portion platform 74.

Figure 15:
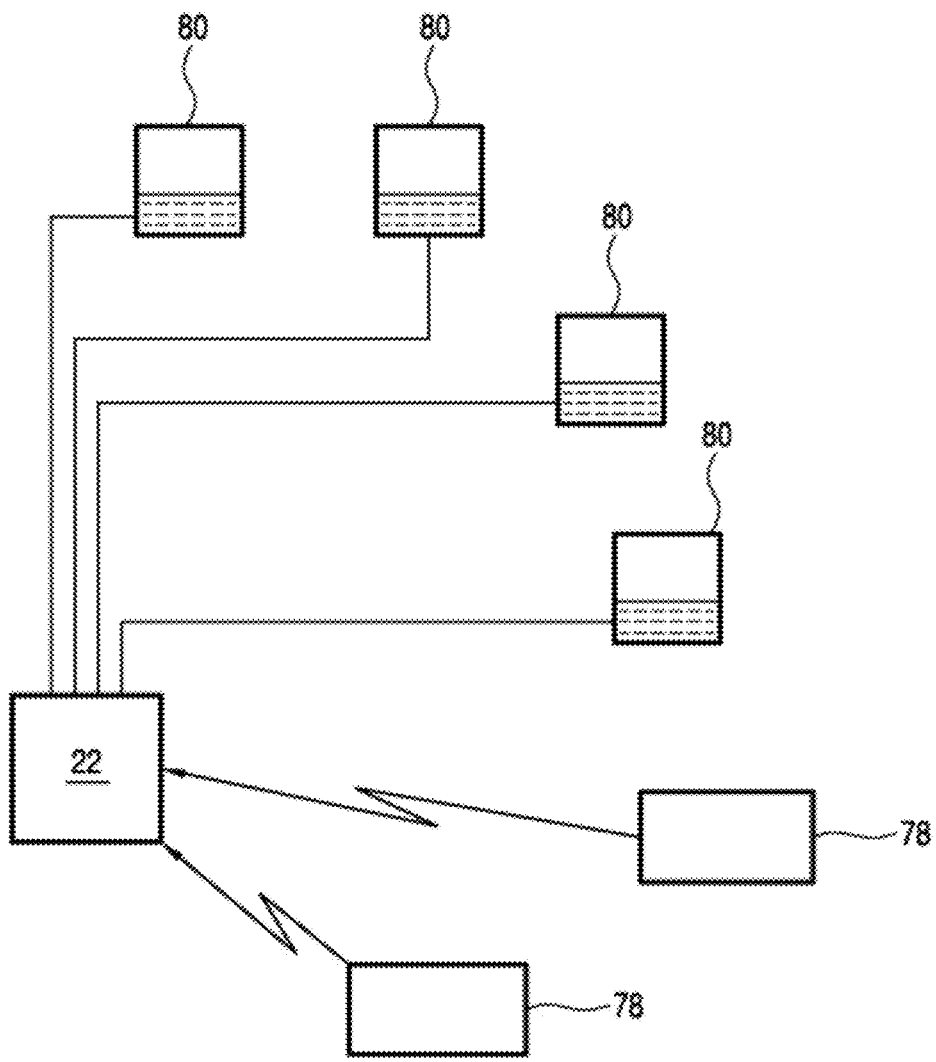
FIG. 15 is a view of a portion of a system configured to provide inputs to the automatic food loading system of FIG. 12.

Referring to FIG. 15, an implementation of the conventional automatic food loading system 10 in a working environment is shown. Control system 22, which includes a controller and either a wire harness or a wireless data system, may receive signals from a variety of locations indicative of a demand for cooked food product 26. Control system 22 aggregates the demand from multiple locations, such as one or more wireless data entry or POS devices 78 and/or one or more cash registers 80 or similar devices. Using the aggregated demand from all data sources, control system 22 transmits control signals to food transfer system 14 to move food product 26 to loader system 16.

If a cartridge 30 empties prior to the achieving a full loader unit 44, control system 22 moves a cartridge 30 containing food product 26 to transfer position 32 so that additional food product 26 may be loaded into loader unit 44 until loader unit 44 reaches the capacity required by control system 22 or the capacity of loader unit 44. Once loader system 44 has reached the capacity set by control system 22 or full capacity, control system 22 extends loader unit 44 vertically from freezer unit 20 and positions loader unit 44 to load a cooking unit, such as vertical grill 24, or an input to a cooking unit. Vertical grill 24 also communicates with control system 22 and provides signals indicating readiness to receive uncooked food product 26. Food product 26 is cooked using the described process until the needs of all POS inputs have been met.

An example of an automatic food loading system is disclosed in U.S. Pat. No. 9,867,501. The entire content of U.S. Pat. No. 9,867,501 is hereby incorporated by reference.

Figure 16:
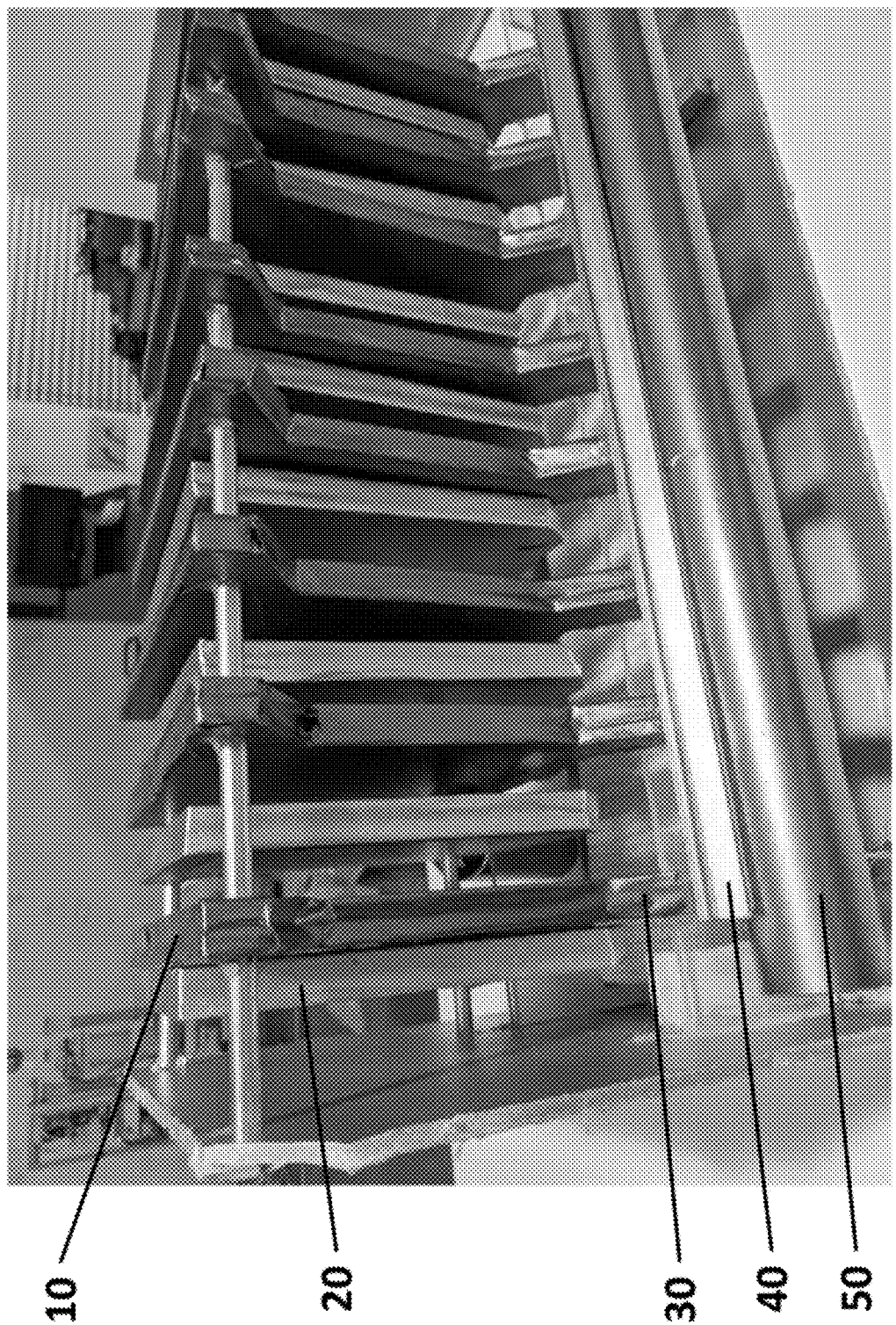
FIG. 16 is a first side view of a vertical grill.

FIG. 16 illustrates a vertical grill having first heating plates 10 and movable second heating plates 20. The first heating plates 10 are connected to a heating system that includes a heat generator 50 for creating a heated medium, such as steam, and heating conductors 30, which convey the heated medium to the first heating plates 10. The heated medium is contained within the interior of the first heating plates 10, thereby enabling the transfer of heat from a surface of a first heating plate 10 to a product to be cooked.

The combination of a first heating plate 10 and a movable second heating plate 20 creates a single grilling (cooking) slot that enables the cooking of a product between the first heating plate 10 and the movable second heating plate 20.

With respect to FIG. 16, the heat generator 50 is sealed and preferably produces steam. The steam is about 250 PSI to realize a temperature of about 400 F.

The steam condenses on cooler areas (surfaces interacting with the product cooking) and the water then falls back down to the heat generator 50 through heating conductors 30.

As illustrated in FIG. 16, the first heating plates 10 are heated by a common heat generator 50. However, it is noted that each first heating plate 10 may be heated by a distinct and independent heat generator 50.

Moreover, as illustrated in FIG. 16, the first heating plates 10 are stationary (non-movable); however, the first heating plates 10 may be designed to be movable.

Figure 17:
FIG. 17 is a second side view of the vertical grill of FIG. 16.

FIG. 17 illustrates an opposite side of the vertical grill illustrated in FIG. 16. As illustrated in FIG. 17, the vertical grill includes first heating plates 10 and movable second heating plates 20. The movable second heating plates 20 are connected to individual heat generators 60 for creating a heated medium, such as steam, which is conveyed to the movable second heating plates 20. The heated medium is contained within the interior of the movable second heating plates 20, thereby enabling the transfer of heat from a surface of a movable second heating plate 20 to a product to be cooked.

With respect to FIG. 17, the heat generators 60 are sealed and preferably produce steam. The steam is about 250 PSI to realize a temperature of about 400 F.

The steam condenses on cooler areas (surfaces interacting with the product cooking) and the water then falls back down to the heat generators 60.

As illustrated in FIG. 17, the first heating plates 10 are stationary (non-movable); however, the first heating plates 10 may be designed to be movable. FIG. 17 further illustrates a conveyor system 70 that transports a cooked product away from the vertical grill.

By having the second heating plate 20 to be movable, each grill (cooking) slot of the vertical grill is able to operate (cooking) independently without impacting the cooking of a product in another grilling (cooking) slot within the vertical grill.

By having the second heating plate 20 being heated by individual heat generators 60, each grill (cooking) slot of the vertical grill is able to operate (cooking) independently without impacting the cooking of a product in another grilling (cooking) slot within the vertical grill.

By having the second heating plate 20 to be movable and being heated by individual heat generators 60, each grill (cooking) slot of the vertical grill is able to operate (cooking) independently without impacting the cooking of a product in another grilling (cooking) slot within the vertical grill.

Figure 18:
FIG. 18 through FIG. 20 are top perspective views of the vertical grill of FIG. 16 in conjunction with an automatic food loading system.

FIG. 18 illustrates a food storage system (compartment) located above the vertical grill. Between the food storage system and the vertical grill is a trap door 80 that separates the cold zone of the food storage system and the vertical grill. When not in use, the trap door 80 is closed to minimize the heat from the vertical grill from impacting the product if the food storage system.

Figure 19:
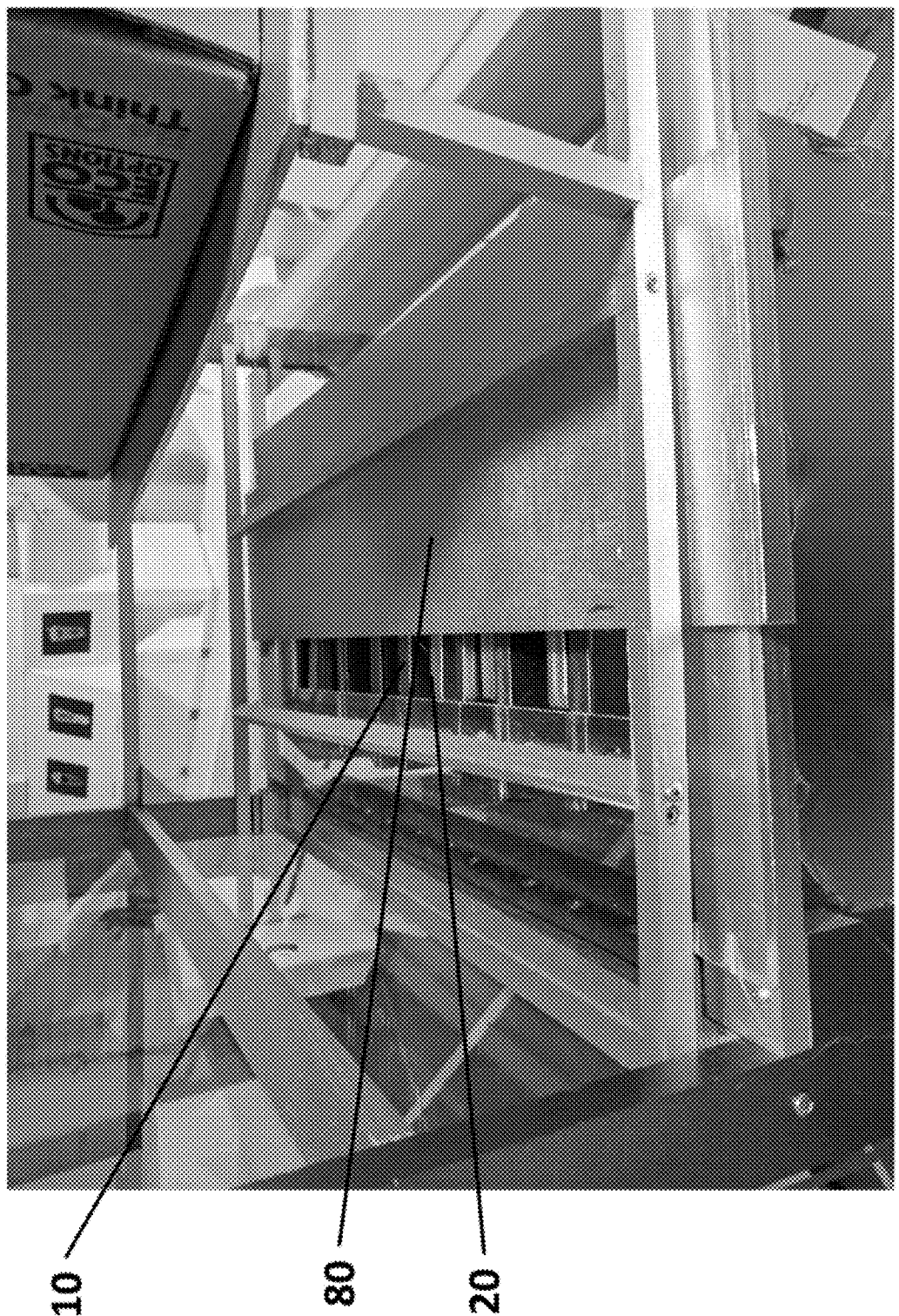
Figure 20:

As illustrated in FIGS. 19 and 20, the trap door 80 opens so that the vertical grill can be accessed.

Figure 21:
FIG. 21 through FIG. 23 are top perspective views of the vertical grill of FIG. 16 in conjunction with an automatic food loading system with a delamination system.
Figure 22:
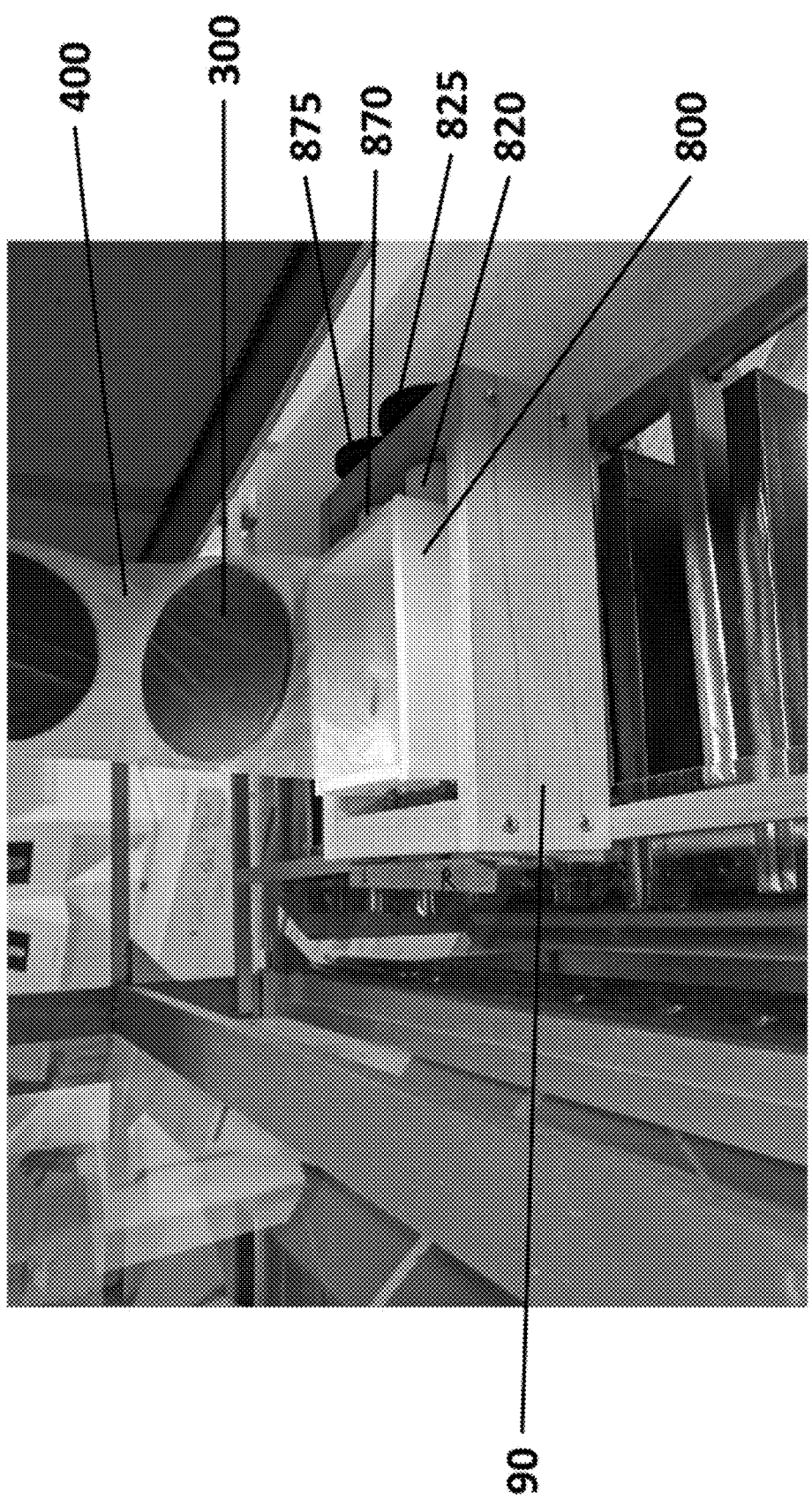
Figure 23:

As illustrated in FIG. 21 through FIG. 23, a delamination trolley 90 is located above the area associated with the trap door 80 (in the closed position). The delamination trolley 90 rides along tracks 100 from one end of the vertical grill to another end of the vertical grill.

As illustrated in FIG. 21, the delamination trolley 90 includes a delamination system 800 to delaminate a food product 300 from between two lamination films 400. The delamination system 800 includes rollers 820 and 870 to take in the two lamination films 400 after the two lamination films 400 pass by two nips (not shown), which facilitate the delamination process. The rollers 820 and 870 are driven by drive gears 825 and 875, which are connected to a drive motor(s). It is noted that drive gears 825 and 875 may be connected to a single drive motor or independent drive motors.

Figure 24:
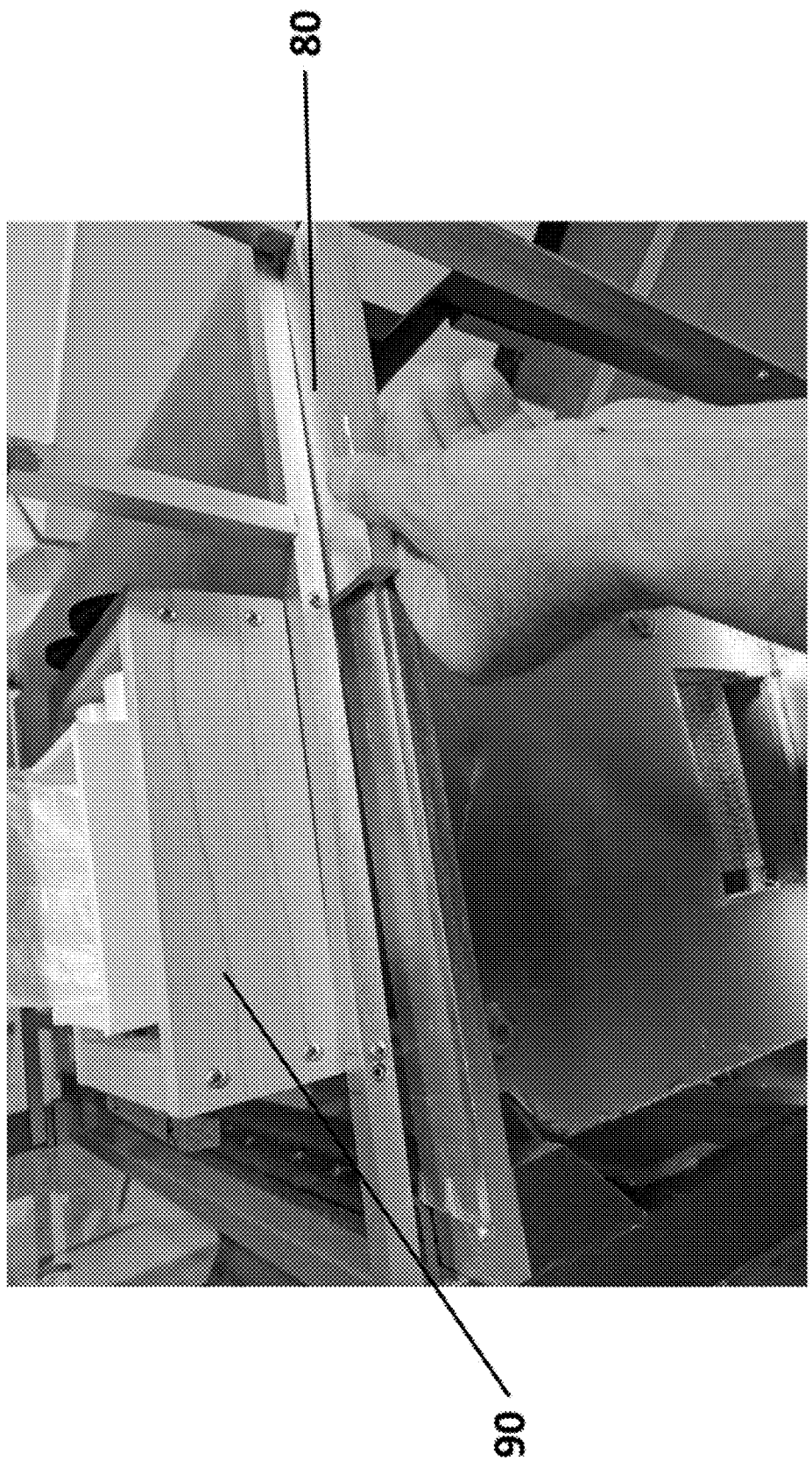
FIG. 24 illustrates the delamination system in a parked or home position.

FIG. 24 illustrates the delamination trolley 90 in a home or parked location. The delamination trolley 90 is moved to the home or parked location when the delamination trolley 90 is not in use. When the delamination trolley 90 is in a home or parked location, the trap door 80 closes.

Figure 25:
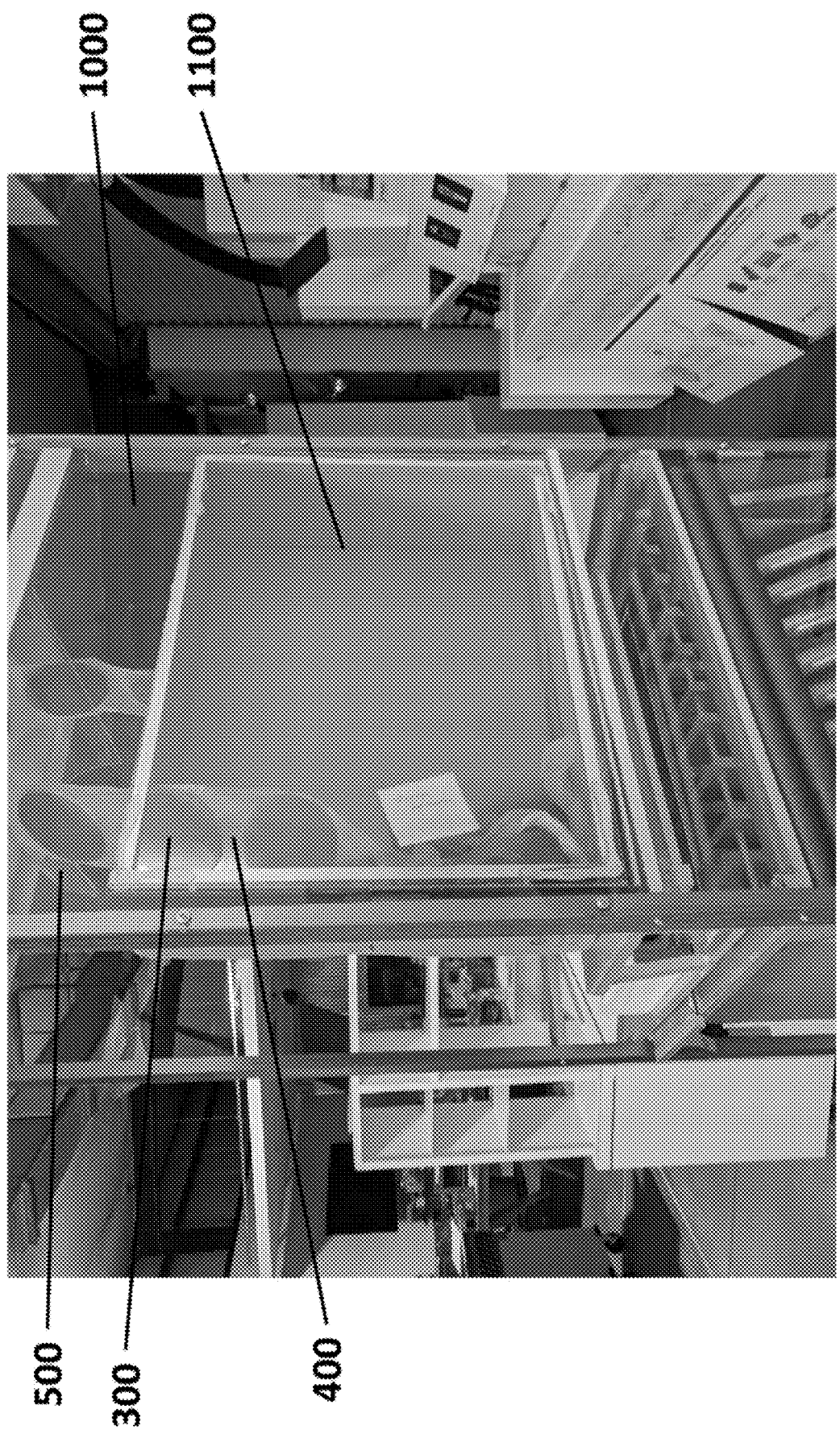
FIG. 25 illustrates an automatic food loading system for a vertical grill.

As illustrated in FIG. 25, the laminated food product (food product 300 laminated by lamination films 400) is stored in a food storage module 1100 within the food storage system (compartment) 1000. The laminated food product is preferably stored in a fan-folded fashion.

As further illustrated in FIG. 25, the laminated food product (food product 300 laminated by lamination films 400) exits a top portion of the food storage module 1100 and travels over an inversion curve 500 to enable the laminated food product to travel downwardly towards the delamination trolley 90 located over the vertical grill.

Figure 26:
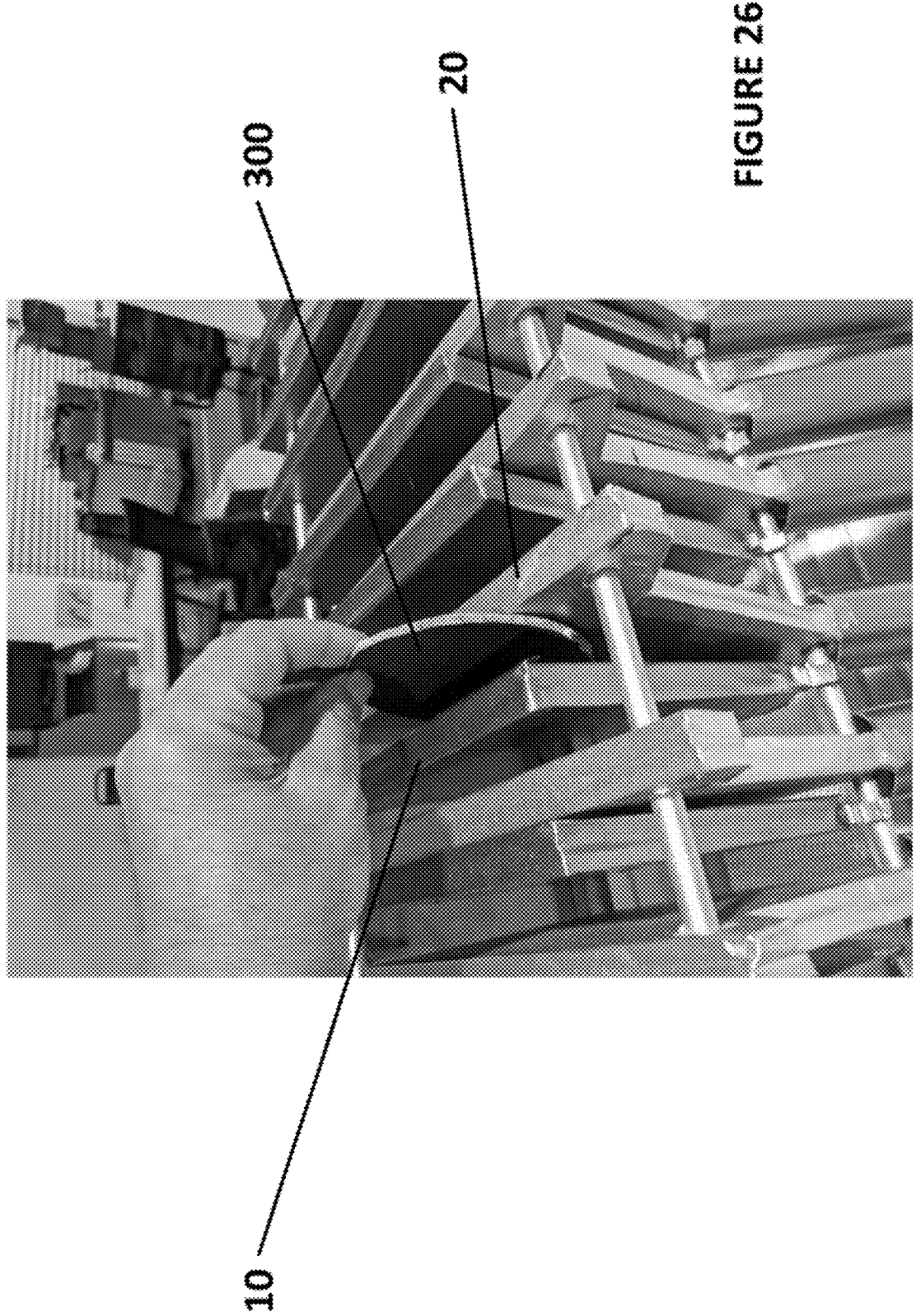
FIG. 26 illustrates the loading of the vertical grill of FIGS. 16 and 17.

FIG. 26 illustrates a delaminated food product 300 being placed in a grilling (cooking) slot created by a first heating plate 10 and a movable second heating plate 20. In the embodiment discussed above and below, when a delaminated food product 300 is placed in a grilling (cooking) slot created by a first heating plate 10 and a movable second heating plate 20, the delamination trolley 90 is located above the desired grilling (cooking) slot and the rollers 820 and 870 are driven to delaminate the food product 300 and move the delaminated food product 300 into the grilling (cooking) slot.

Figure 27:
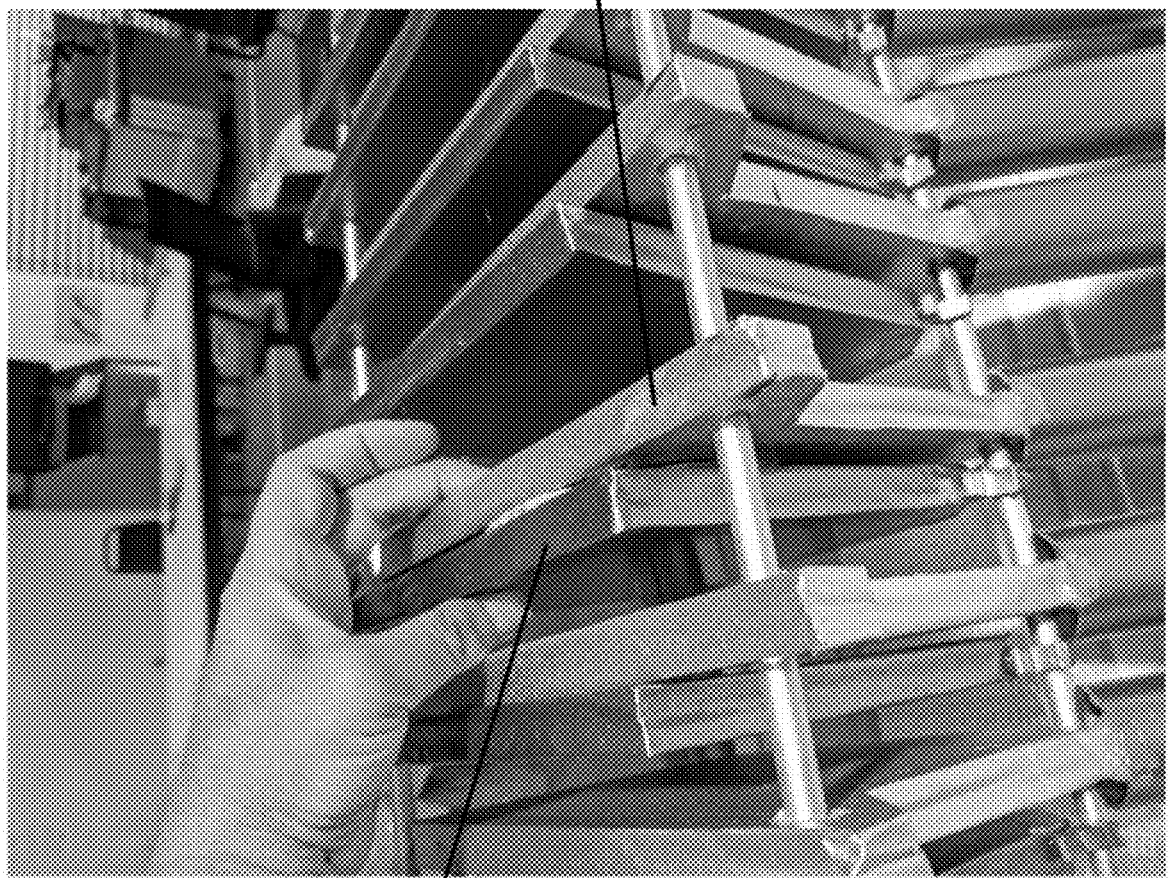
FIG. 27 illustrates a cooking position of an individual cooking slot of the vertical grill of FIGS. 16 and 17.

As illustrated in FIG. 27, the delaminated food product 300 enters into the grilling (cooking) slot and the movable second heating plate 20 moves towards the first heating plate 10 of the grilling (cooking) slot to hold the delaminated food product 300 within the grilling (cooking) slot until the delaminated food product 300 is fully cooked.

Figure 28:
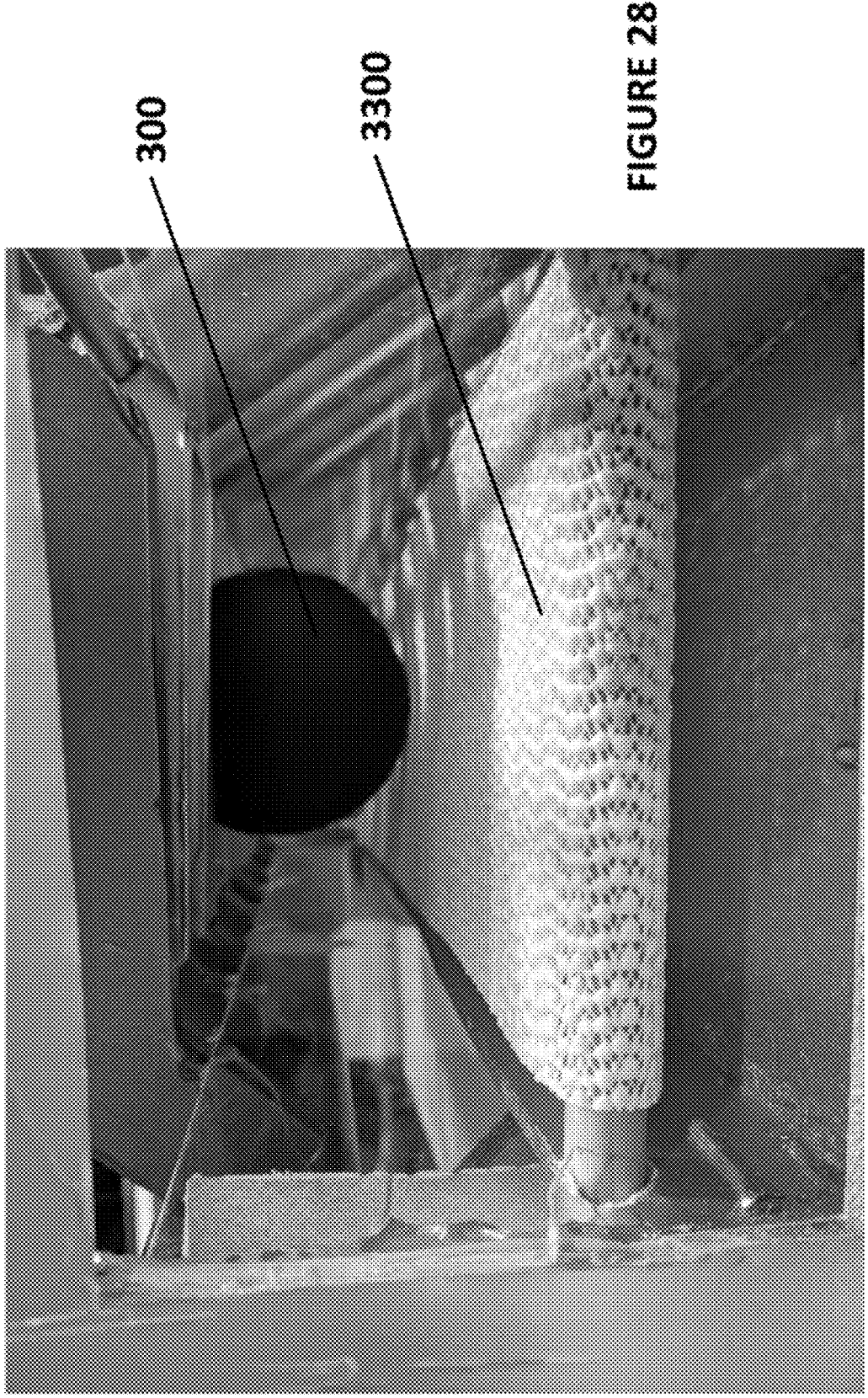
FIG. 28 and FIG. 29 illustrate a conveyor system used in conjunction with the vertical grill of FIGS. 16 and 17.

Upon completion of the cooking cycle, the movable second heating plate 20 moves away from the first heating plate 10 of the grilling (cooking) slot to release the cooked food product 300 from the grilling (cooking) slot so that the cooked product 300 falls onto conveyor 3300, as illustrated in FIG. 28.

Figure 29:
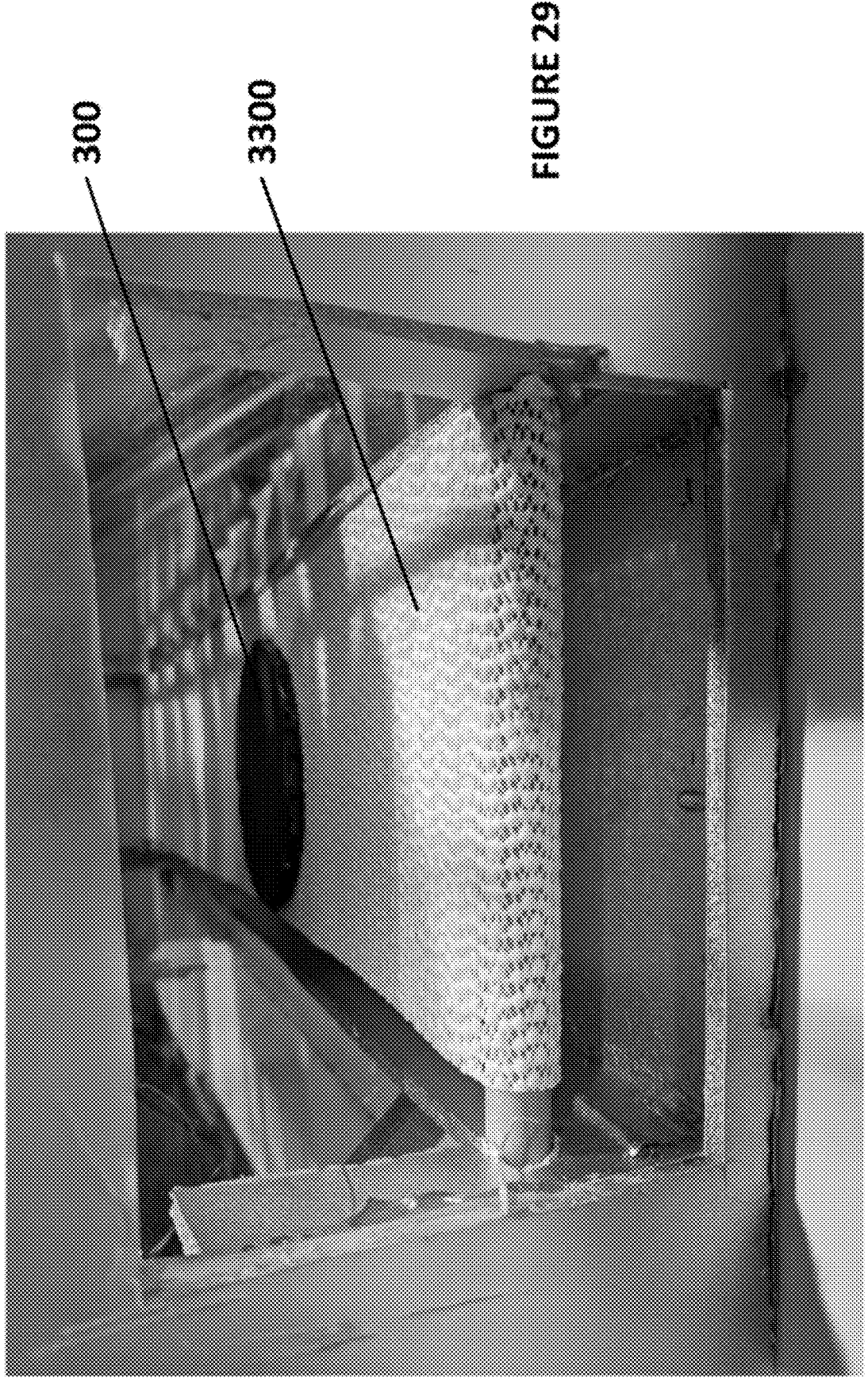
Figure 30:
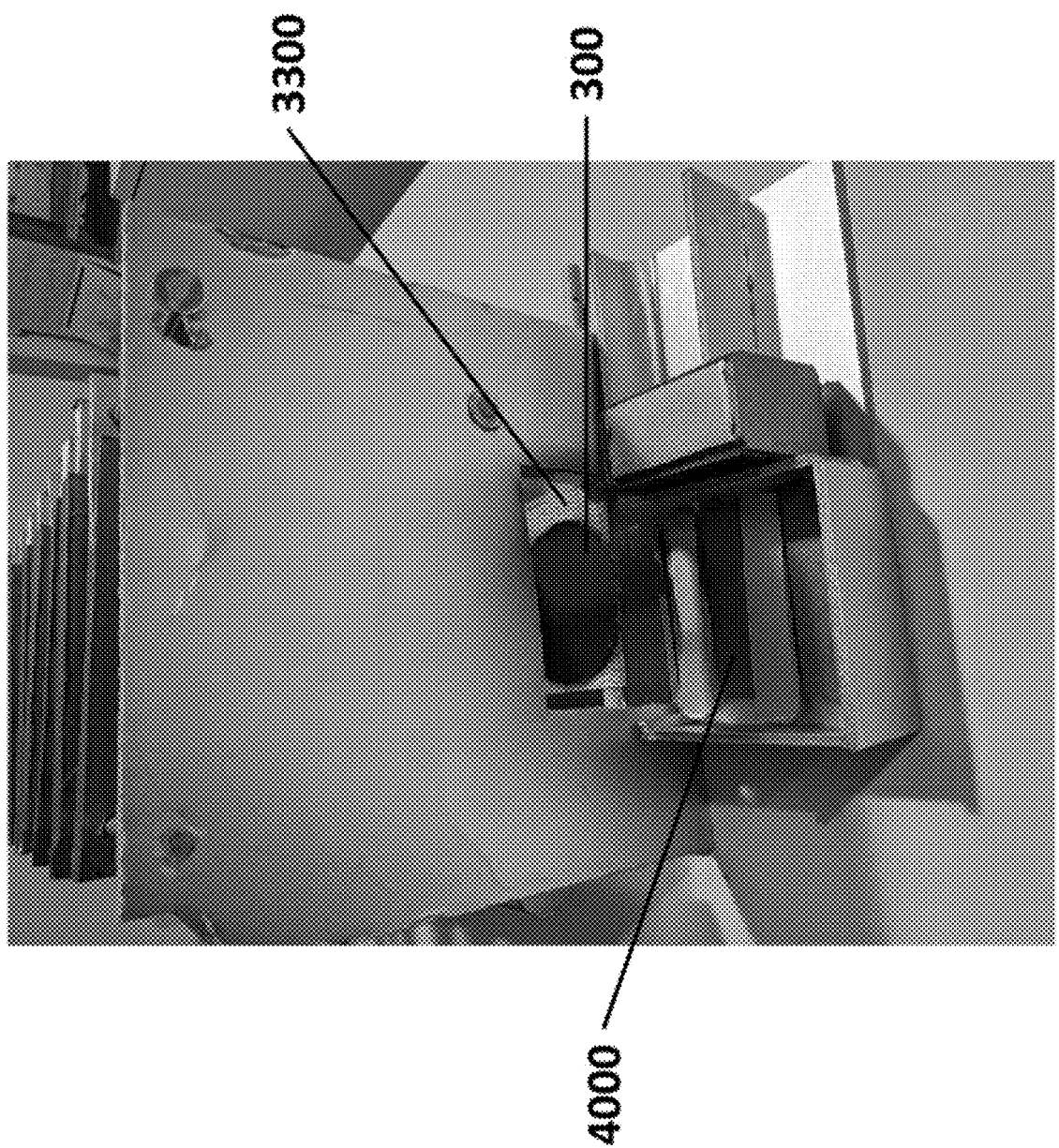
FIG. 30 illustrates a staging bin for the vertical grill of FIGS. 16 and 17.

As illustrated in FIG. 29, the cooked product 300 is moved away from the grilling (cooking) slot by conveyor 3300. The cooked product 300 is conveyed by conveyor 3300 to a staging bin 4000, as illustrated in FIG. 30. The staging bin 4000 is a first-in-first-out staging bin, as will be discussed in more detail.

Figure 31:
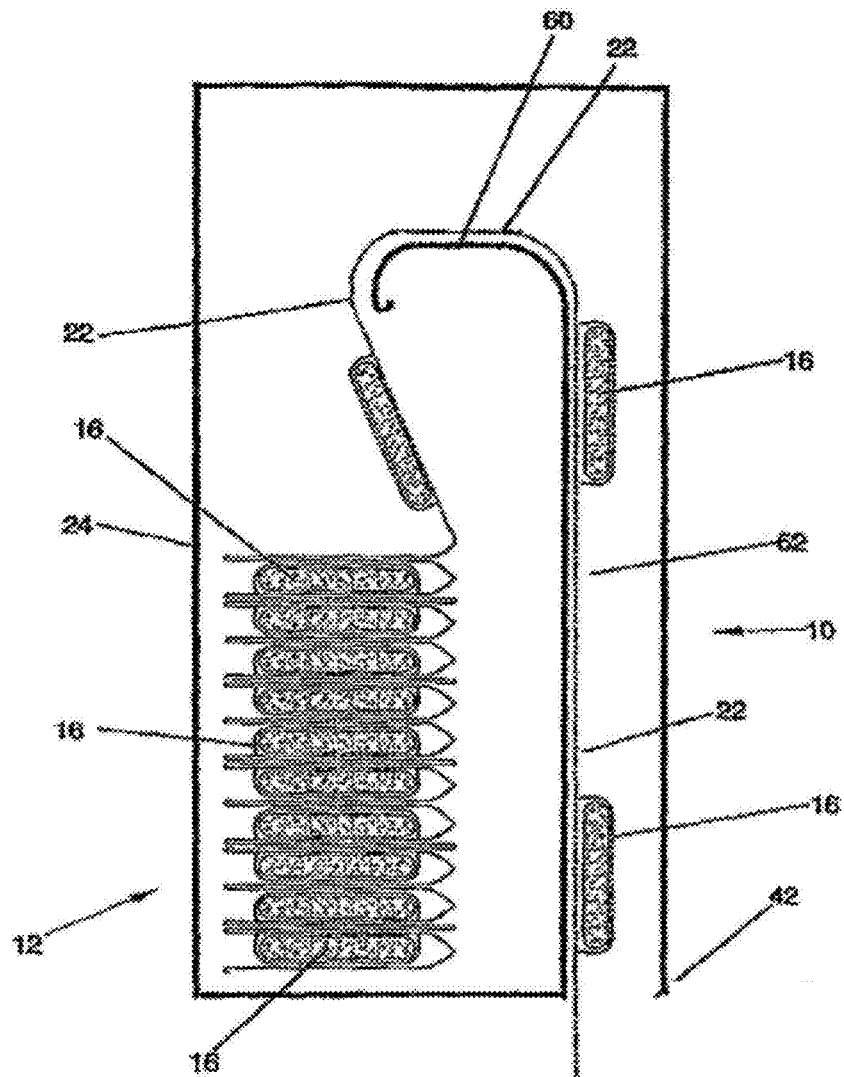
FIG. 31 is a front view of the food handling system.

As illustrated in FIG. 31, a food handling system 10 stores and dispenses food products including a food storage assembly 12 to store the food products therein and a food dispensing assembly 14 to dispense the food products from the food dispensing assembly 14 of the food handling system 10.

As illustrated in FIG. 31, an inversion curve 60 may be located within the food storage module such that the food storage module has an opening at its bottom to enable the laminated food product to travel to the delamination trolley.

As illustrated in FIG. 31, the food products 16 are fan folded as a series of food products 16 stacked one upon another in a dispensing configuration or disposition when stored within the food storage assembly 12. As will be evident, the food products 16 are stored and dispensed onto a dish, conveyor, or other surface (not shown) in a hygienic manner without handling or touching by a human operator.

As illustrated in FIG. 31, the food storage assembly 12 includes a hollow food product storage enclosure or carton 24 to house and support the plurality of food products 16 sealed or disposed between the first elongated strip of flexible material or film 18 and the second elongated strip of flexible material or film 20 of the continuous laminated food strip 22 stacked in the fan folded configuration.

Figure 32:
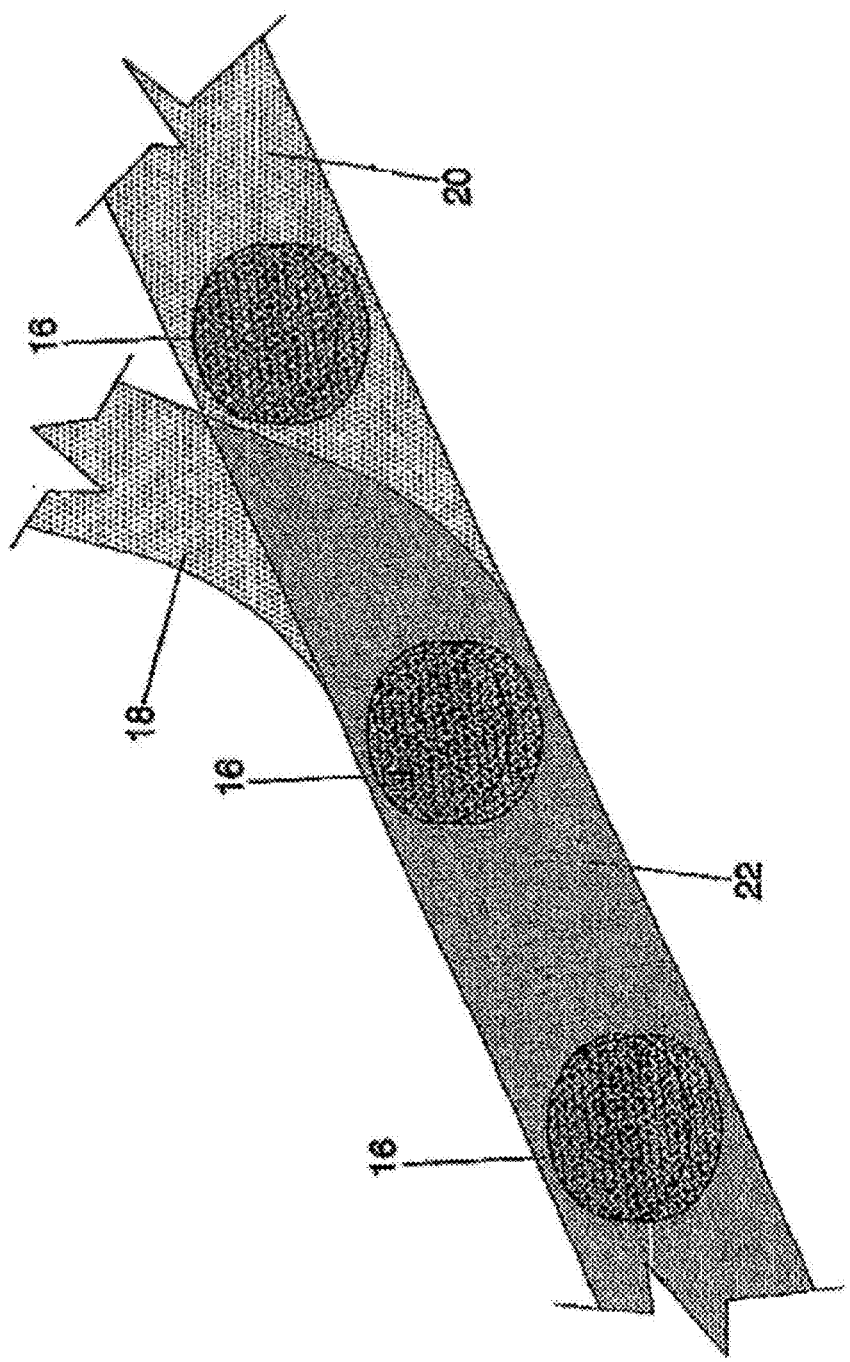
FIG. 32 is a perspective view of a food product hygienically encased within a continuous laminated food strip.

As illustrated in FIG. 32, food products 16, such as hamburger patties, are packaged between a first elongated strip of flexible material or film 18 and a second elongated strip of flexible material or film 20. The first elongated strip of flexible material or film 18 and the second elongated strip of flexible material or film 20 may be sealed together by heat and/or pressure to cooperatively form a continuous laminated food strip 22 to protect the food products 16 there between for storage within the food storage assembly 12 until the first elongated strip of flexible material or film 18 and the second elongated strip of flexible material or film 20 are separated by a delamination system.

Figure 33:
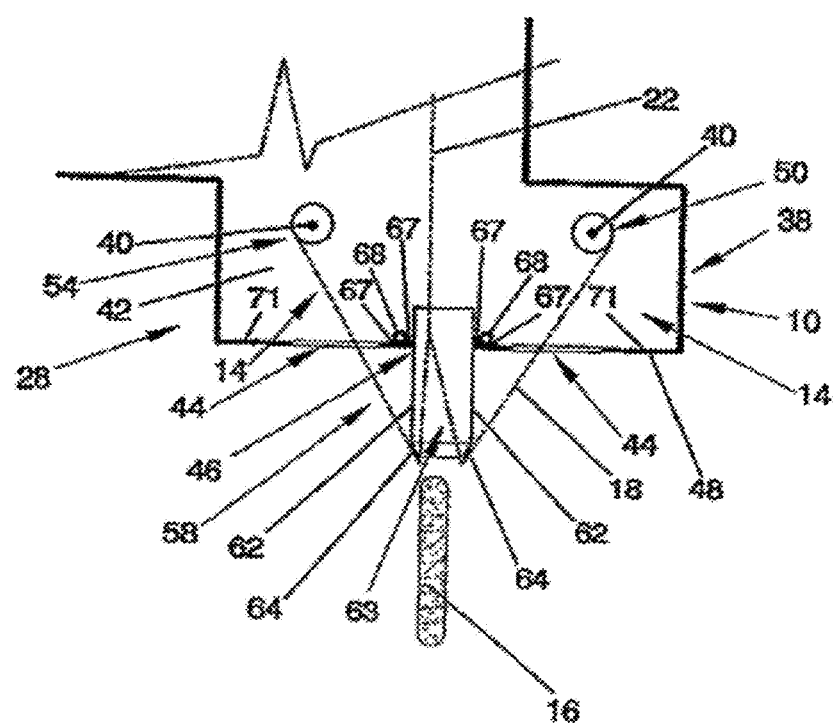
FIG. 33 is a partial detailed schematic front view of the food dispensing assembly deployed in the delamination system.

As illustrated in FIG. 33, a food dispensing assembly includes a food dispensing assembly support housing 38 having a pair of rotatably mounting members or pins each indicated as 40 mounted to a substantially vertically disposed support wall or member 42 and a pair of film separation slots or openings each indicated as 44 and a centrally dispensed laminated strip opening 46 formed through a substantially horizontally disposed lower wall 48 extending outwardly from the substantially vertically disposed support member 42 to receive the first elongated strip of flexible material or film 18 and the second elongated strip of flexible material or film 20, and the continuous laminated food strip 22 respectively when the food dispensing assembly 14 is operatively mounted on the food dispensing assembly support 28 as described more fully hereinafter.

Figure 34:
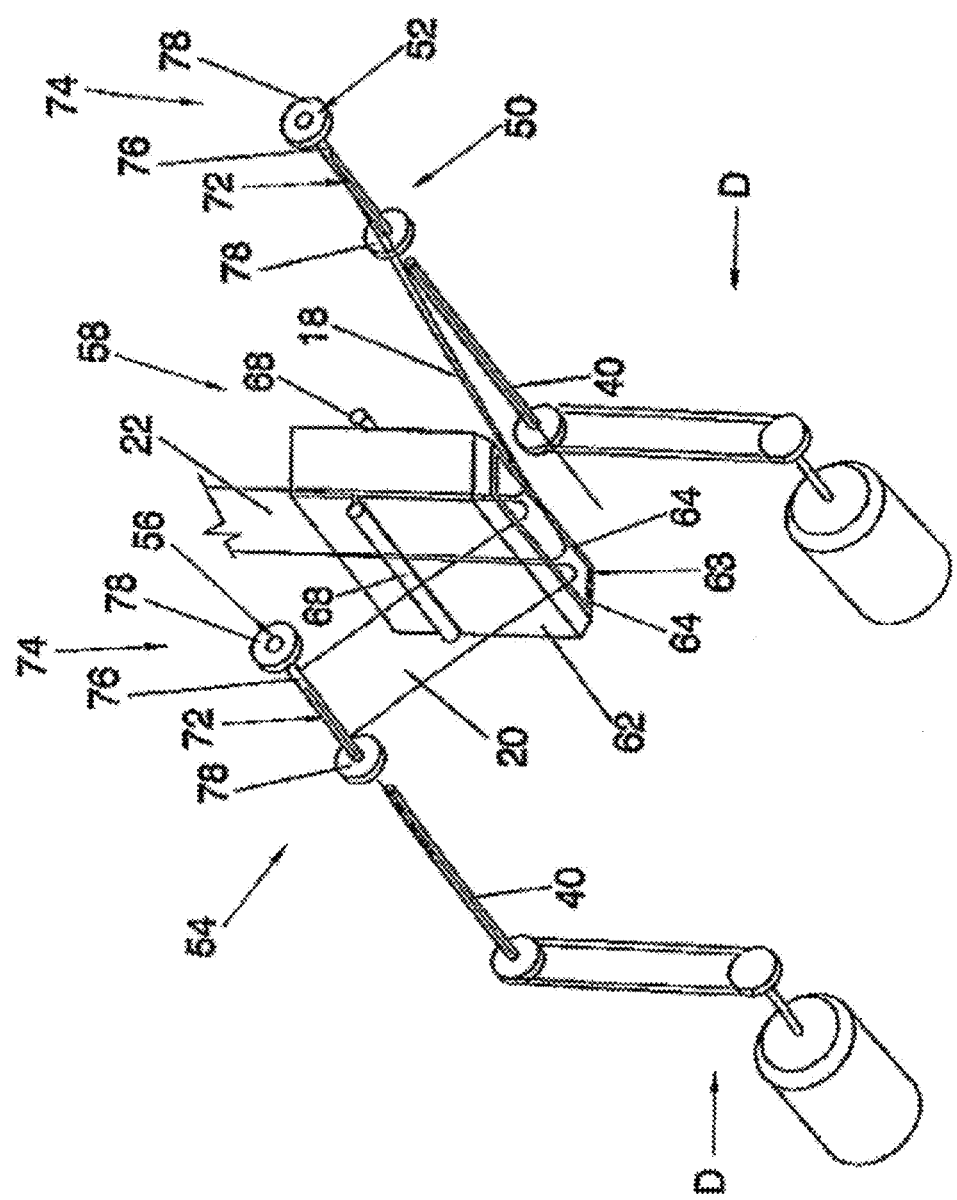
FIG. 34 is a partial perspective view of the food dispensing assembly deployed in the delamination system.

As illustrated in FIGS. 33 and 34, the food dispensing assembly 14 includes a first film strip reel or film take-up device 50 including a centrally disposed pin mounting channel 52 coupled to the leading end portion of the first elongated strip of flexible material or film 18 and a second film strip reel or film take-up device 54 including a centrally disposed pin mounting channel 56 coupled to the leading end portion of the second elongated strip of flexible material or film 20 such that when the first film strip reel or film take-up device 50 and the second film strip reel or film take-up device 54 are mounted on the corresponding rotatable mounting member or pin 40 extending through centrally disposed pin mounting channels 52 and 56, respectively.

The food dispensing assembly 14 further includes a food strip directional control 58 mounted to the substantially horizontally disposed lower wall 48 of the food dispensing assembly support 38 to change the direction of travel of the continuous laminated food strip 22 directed to the food dispensing assembly 14 by a laminated food strip guide comprising an upper arcuate guide member 60 and a substantially vertical guide member 62 disposed within the food storage assembly 12.

The food strip directional control 58 comprises a pair of directional control members each indicated as 62 disposed in spaced relationship to cooperatively form a film slot or channel 63 to receive the continuous laminated food strip 22 and the food products 16 therethrough each directional control member 62 includes a directional control surface 64 to engage the outer surfaces of the first elongated strip of flexible material or film 18 and second elongated strip of flexible material or film 20 when the first film strip reel or film take-up device 50 and the second film strip reel or film take-up device 54 are mounted on the corresponding rotatable mounting member or pin 40.

When so configured, As illustrated in FIG. 34, a drive means D, including a motor and belt or suitable mechanism, rotates the rotatable mounting members or pins 40 rotating the corresponding first film strip reel or film take-up device 50 and the second film strip reel or film take-up device 54 thereby separating the first elongated strip of flexible material or film 18 and the second elongated strip of flexible material or film 20 allowing the food products 16 to drop or fall onto a conveyor, dish, or other surface (not shown).

The preferred angle for redirecting the first elongated strip of flexible material or film 18 and the second elongated strip of flexible material or film 20 is at least 170 degrees. However, it is contemplated that at least either the first elongated strip of flexible material or film 18 and the second elongated strip of flexible material or film 20 is redirected at least about 90 degrees.

Figure 35:
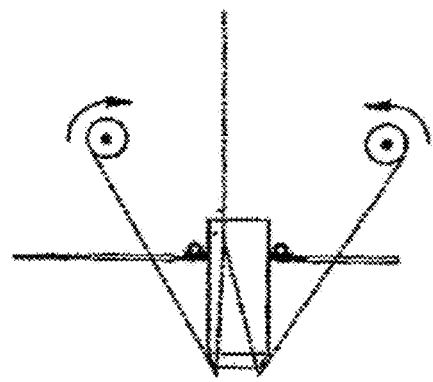
FIGS. 35 through 37 schematically depict different dispositions of the film strip take-up devices relative to the food strip directional control.
Figure 36:
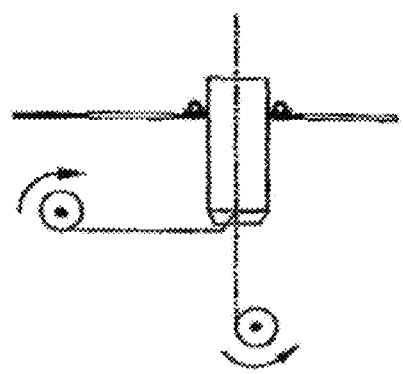
Figure 37:
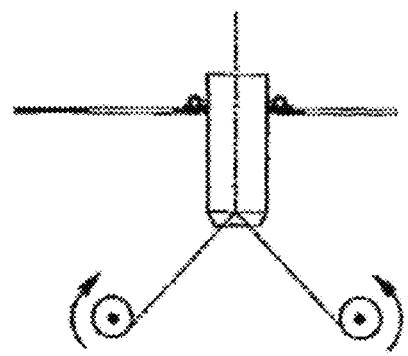

FIGS. 35 through 37 illustrate different examples of redirecting the first elongated strip of flexible material or film 18 and the second elongated strip of flexible material or film 20.

FIG. 35 illustrates both films being redirected to form a redirect angle greater than 90 degrees but less than 360 degrees.

FIG. 36 illustrates only one film being redirected to form a redirect angle of approximately 90 degrees.

FIG. 37 illustrates both films being redirected to form a redirect angle of approximately 90 degrees.

As illustrated in FIG. 33, the food strip directional control 58 of the food dispensing assembly 14 are formed on the lower portions of side walls 70 that are partially disposed in the centrally disposed laminated strip opening 46 with an assembly support member 68 attached or formed on opposite side walls 70 to engage the upper surface 71 of the substantially horizontally disposed lower wall 48 of the food dispensing assembly support housing 38 on opposite sides of the centrally disposed laminated strip opening 46.

Each assembly support member 68 may be disposed between a corresponding pair of retention members each indicated as 67 to cooperatively form an assembly support member receiving channel 69.

Outer end portions of the first elongated strip of flexible material or film 18 and the second elongated strip of flexible material or film 20 are attached or coupled to the first film strip reel or film take-up device 50 and the second film strip reel or film take-up device 54 respectively by an adhesive or through a film slot 72 described hereinafter when deployed.

The first film strip reel or film take-up device 50 and the second film strip reel or film take-up device 54 each comprises a spool 74 including a film strip cross-member 76 to receive the first elongated strip of flexible material or film 18 or the second elongated strip of flexible material or film 20 of the continuous laminated food strip 22 having a film retainer element or member 78 disposed on opposite end portions thereof to retain the first elongated strip of flexible material or film 18 or the second elongated strip of flexible material or film 20 of the continuous laminated food strip 22 thereon during the separation process.

Each film strip cross-member 76 may include the film slot 72 to receive the outer portion of the corresponding first elongated strip of flexible material or film 18 or second elongated strip of flexible material or film 20.

When the food handling system 10 is stored or refrigerated, each film strip cross-member 76 is disposed within the corresponding groove or channel 36 of the corresponding food dispensing assembly support member 32.

The continuous laminated food strip 22, disposed in the food storage assembly 12, is placed in the cold storage.

As previously described, the food dispensing assembly 14 may be at least partially stored with the food storage assembly 12, the food dispensing assembly 14 is disposed at the lower portion of the hollow food product storage enclosure or carton 24. The outer-end portions of the laminated food strips 18 and 20 are connected or coupled to the film take-up devices 50 and 54.

When the first elongated strip of flexible material or film 18 and the second elongated strip of flexible material or film 20 of the continuous laminated food strip 22 is reversed backwards at an angle over the first directional control surface 64 and second directional control surface 66 respectively the first elongated strip of flexible material or film 18 and the second elongated strip of flexible material or film 20 of the continuous laminated food strip 22 are separated allowing the food products 16 to separate from the film of the continuous laminated food strip 22.

This results in unpackaging of the food products 16 from the laminated food strip 22. As this delamination takes place, the delamination food product 16 passes onto the conveyor belt or other receiving surface (not shown).

Thus, delaminated/unpackaged food products 16 under aseptic conditions may be fed to a grill or conveyor oven or any other heat source directly for the purpose of cooking, without the food being even touched by the cooking staff.

Figure 38:
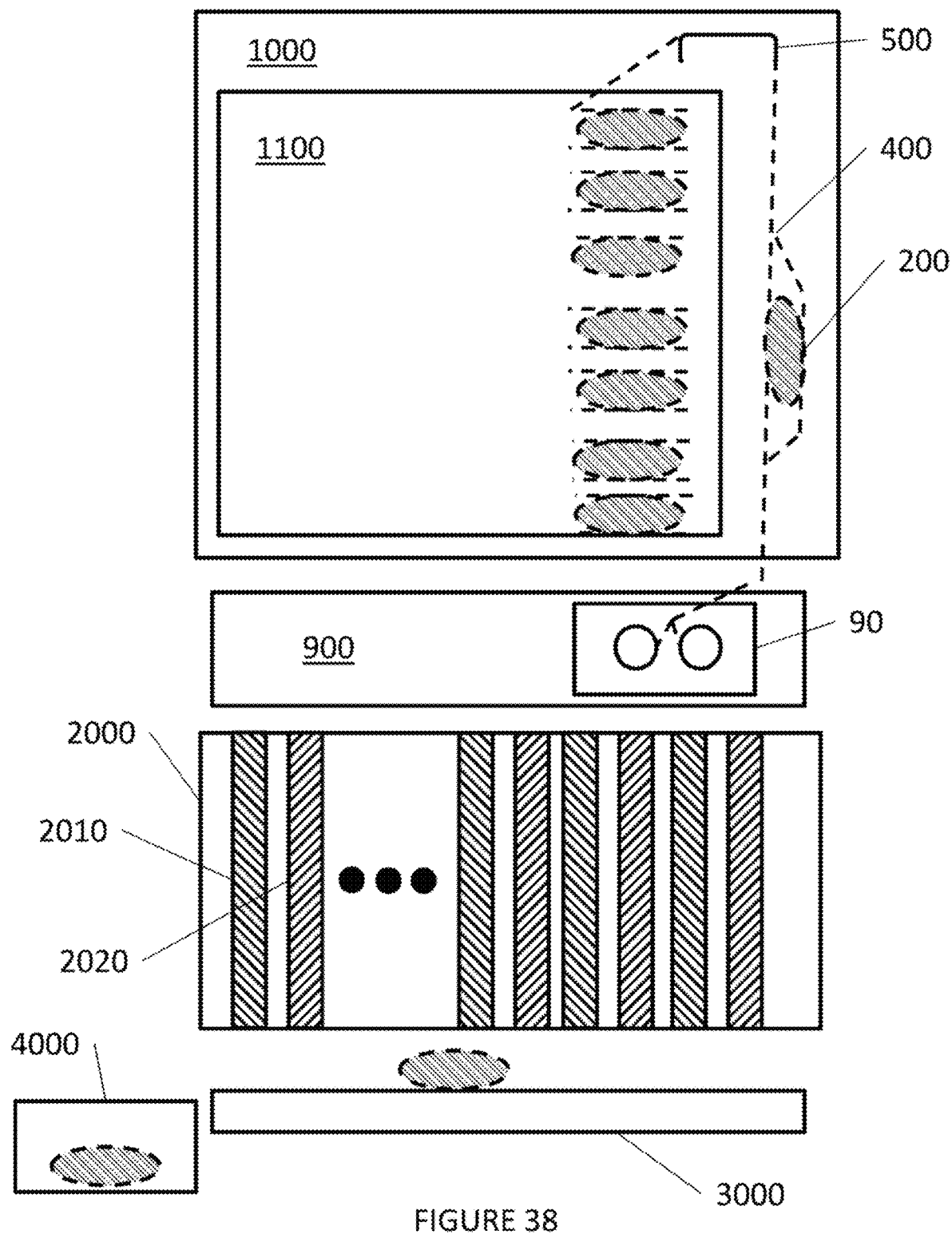
FIG. 38 illustrates a block diagram of an automated grill system with an automatic food loading system.

FIG. 38 illustrates an automated cooking system including a food storage system 1000, a food dispensing system 900, a cooking system 2000, a conveying system 3000, and a staging bin 4000. The food storage system 1000 is located in close proximately to the cooking system 2000, preferably above the cooking system 2000.

The food storage system 1000 includes a removable food module 1100 that includes laminated food product (food product 300 laminated by lamination films 400). The food storage system 1000 also includes an inversion curve 500 to enable the laminated food product to travel downwardly towards the food dispensing system 900 located over the cooking system 2000.

The food dispensing system 900 includes a delamination trolley 90, as described above, for delaminating the laminated food product (food product 300 laminated by lamination films 400) and placing the delaminated food product into a grilling (cooking) slot of the cooking system 2000.

The cooking system 2000 is preferably a vertical grill having multiple first heating plates 2010 and multiple movable second heating plates 2020, as described above.

The conveying system 3000 includes a conveyor that conveys the cooked product from the cooking system 2000 to the staging bin 4000.

The staging bin 4000 is a first-in-first-out bin so that the first placed cooked product is the first cooked product to be removed from the staging bin 4000.

As illustrated in FIG. 38, laminated food product (food product 300 laminated by lamination films 400), stored in the food storage system 1000 in a fan-folded fashion, travels upwardly to the inversion curve 500, which changes the direction of travel of the laminated food product to a downward direction towards the food dispensing system 900.

The food dispensing system 900 includes a delamination trolley 90, which travels along an upper portion of the cooking system 2000. The delamination trolley 90 includes a delamination system that delaminates the food product 300 before placing the delaminated food product in a grilling (cooking) slot of the cooking system 2000, created by a first heating plate 2010 and a movable second heating plate 2020. When a delaminated food product is placed in a grilling (cooking) slot created by a first heating plate 2010 and a movable second heating plate 2020, the delamination trolley 90 is located above the desired grilling (cooking) slot, and the rollers and are driven to delaminate the food product and move the delaminated food product into the grilling (cooking) slot.

Upon entering the desired grilling (cooking) slot, the product is cooked. When the cooking cycle is completed, the cooked product is released onto the conveying system 3000 that includes a conveyor, which conveys the cooked product from the cooking system 2000 to the staging bin 4000.

Figure 39:
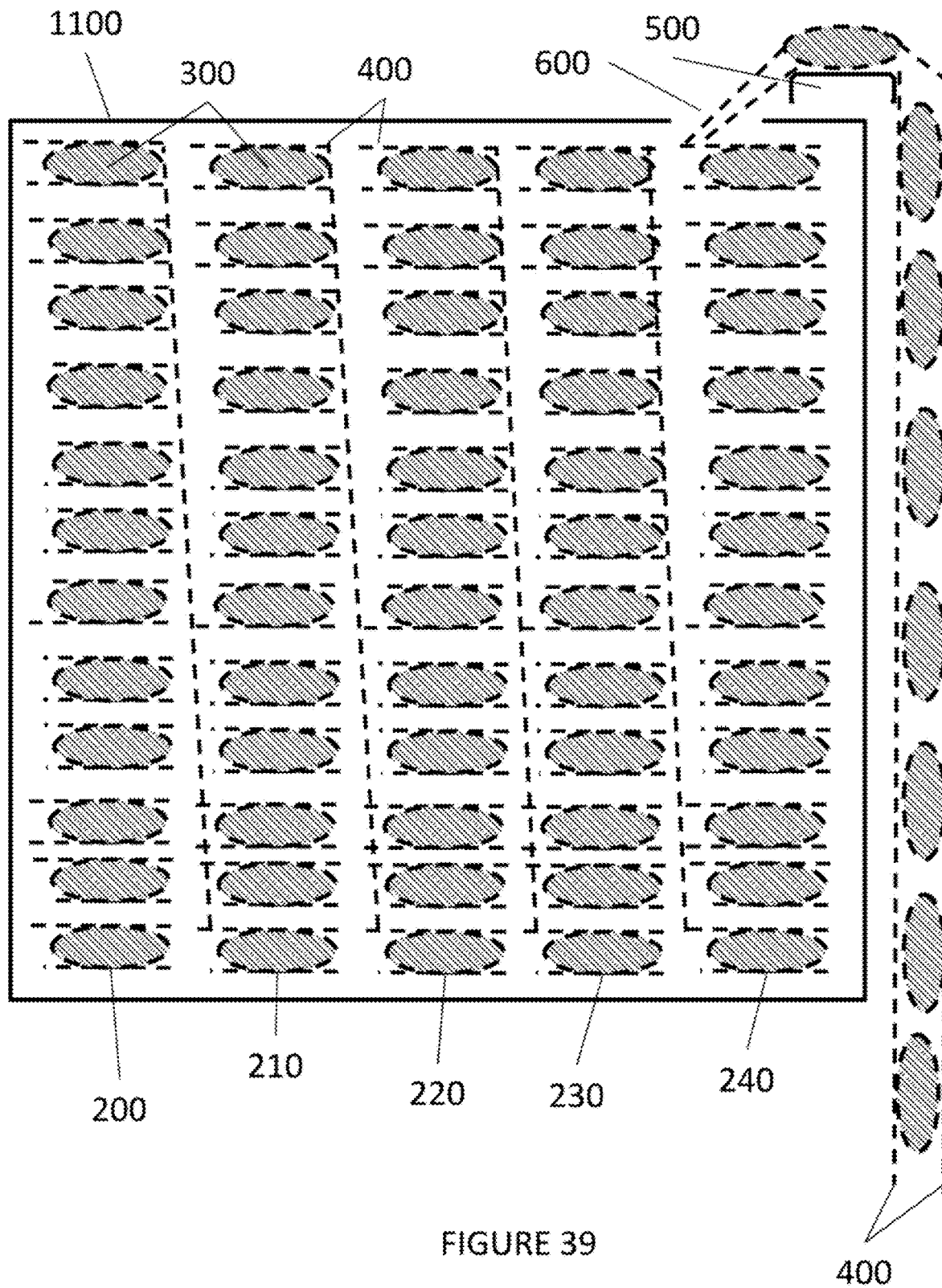
FIG. 39 illustrates a food dispensing module within an automatic food loading system.

FIG. 39 illustrates a removable food module 1100 that includes multiple stacks (200, 210, 220, 230, and 240) of fan-folded laminated food product (food product 300 laminated by lamination films 400). The top of stack 240 is located under opening 600 that enables the laminated food product to exit the removable food module 1100. Above the opening 600, an inversion curve 500 is located to changes the direction of travel of the laminated food product to a downward direction towards a food dispensing system (not shown).

It is noted that the inversion curve 500 may be located within the removable food module 1100. In this alternative embodiment, the opening 600 is located at a bottom of the removable food module 1100, as illustrated in FIG. 31.

Figure 40:
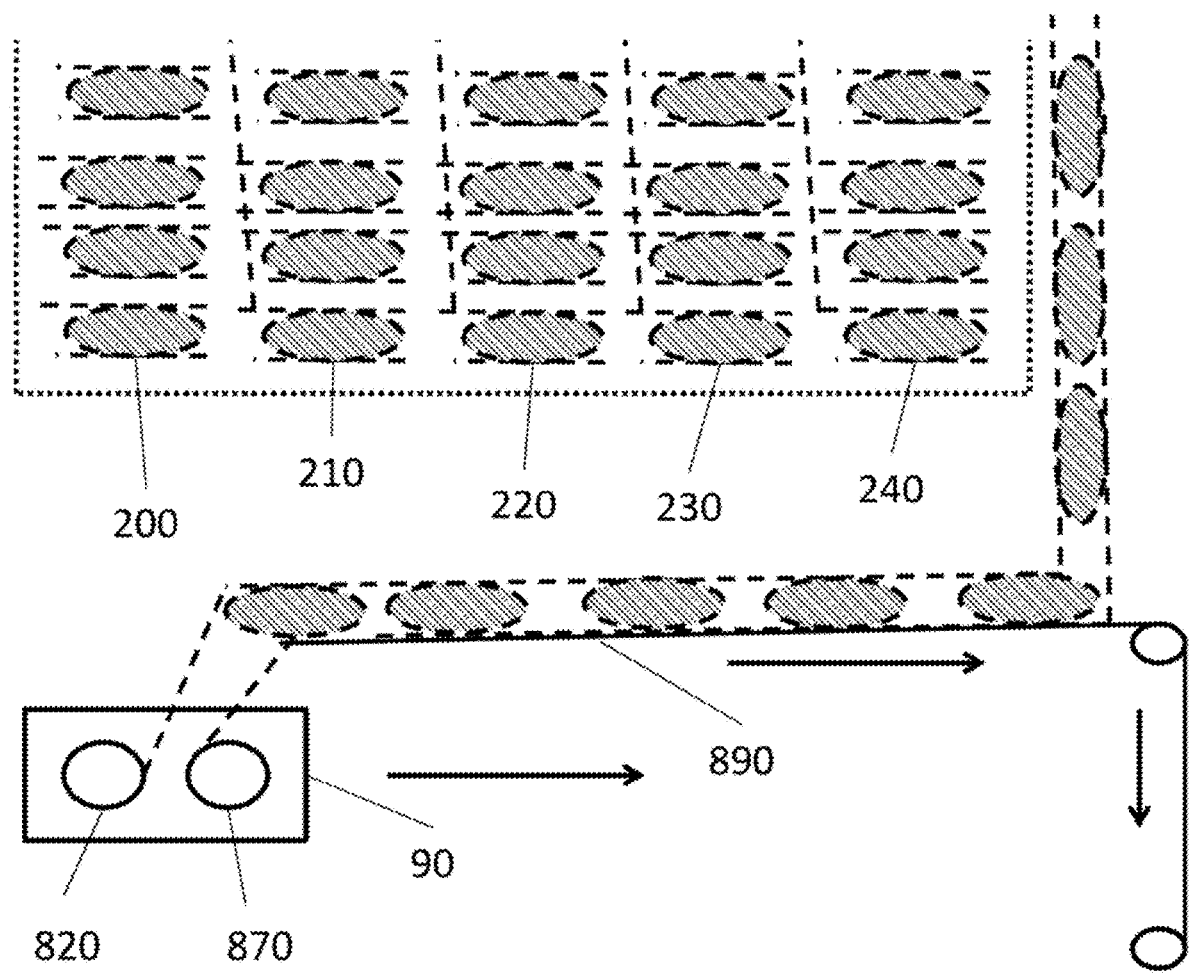
FIG. 40 through FIG. 43 illustrate an operation of the delamination system in loading uncooked food into a vertical grill system.

FIG. 40 illustrates the dispensing of a food product by a delamination trolley 90. As illustrated in FIG. 40, the delamination trolley 90 is located at a first end of the vertical grill, the first end being located at a position (as illustrated) away from the laminated food product travelling downwardly towards the food dispensing system. This first end position may be a home or parked location for the delamination trolley 90 or may be a stop position of the delamination trolley 90 when traversing across the vertical grill.

In the embodiment illustrated in FIG. 40, the food dispensing system includes a diverter 890 that travels in conjunction with the travel of the delamination trolley 90. The diverter 890 keeps the laminated food product from falling upon the vertical grill system as the delamination trolley 90 traverses the vertical grill system.

As illustrated in FIG. 40, as the delamination trolley 90 travels in the direction of the horizontal arrows, the diverter 890 is rolled back in the direction of the horizontal arrows. The diverter 890 may be rolled back to a position below the delamination trolley 90, and thus, as illustrated the diverter 890 will travel in a direction of the vertical arrow.

As the delamination trolley 90 travels in the direction of the horizontal arrows, the rollers 820 and 870 cause the delamination of the food product without causing more laminated food product to be pulled from the removable food module. The delamination trolley 90, travelling in the direction of the horizontal arrows of FIG. 40, delaminates the laminated food product on the diverter 890.

Figure 41:
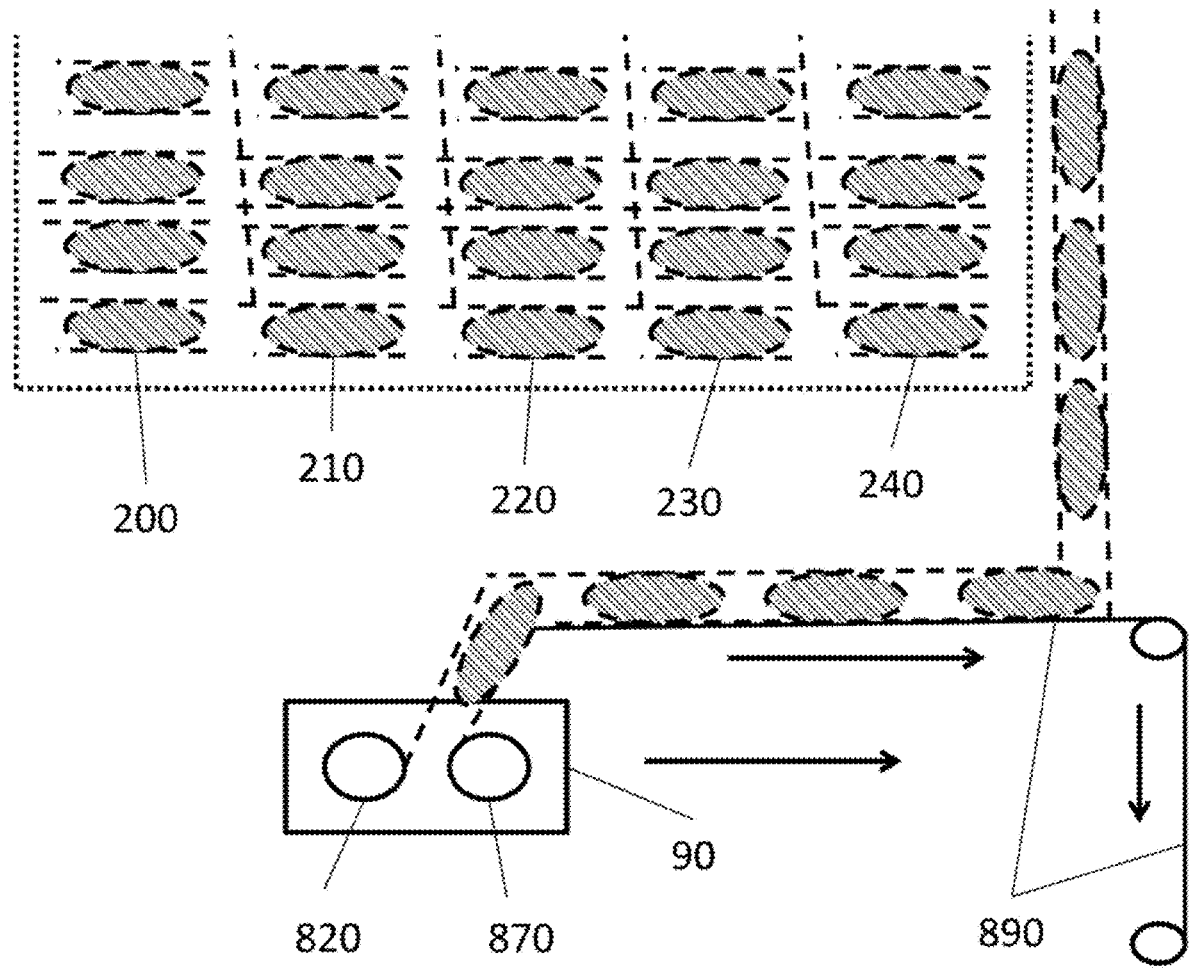

This delamination of the laminated food product on the diverter 890 is shown in FIG. 41, wherein the delamination trolley 90 has traveled along a portion of the vertical grill in the direction of the horizontal arrows and only the laminated food product on the diverter 890 has been delaminated without more laminated food product being pulled from the removable food module because the rollers 820 and 870 are taking up the slack caused by the movement of the delamination trolley 90 and the diverter 890, thereby providing no force to pull more laminated food product from the removable food module.

Figure 42:
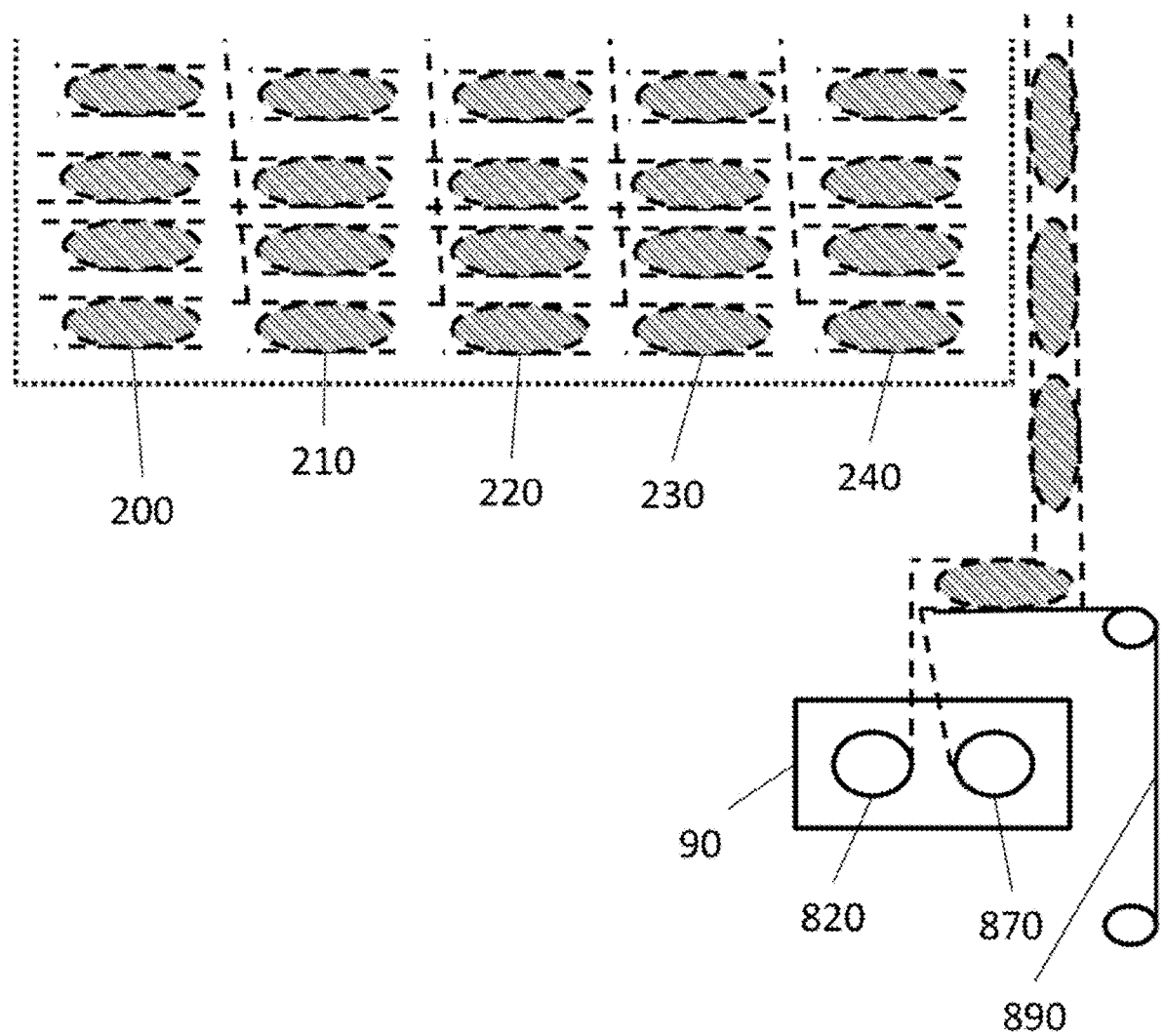

FIG. 42 illustrates the second end position of the delamination trolley 90, which is located at a second end of the vertical grill, the second end being located at a position (as illustrated) under the laminated food product travelling downwardly towards the food dispensing system. The second end position may be a home or parked location for the delamination trolley 90 or may be a stop position of the delamination trolley 90 when traversing across the vertical grill.

Figure 43:
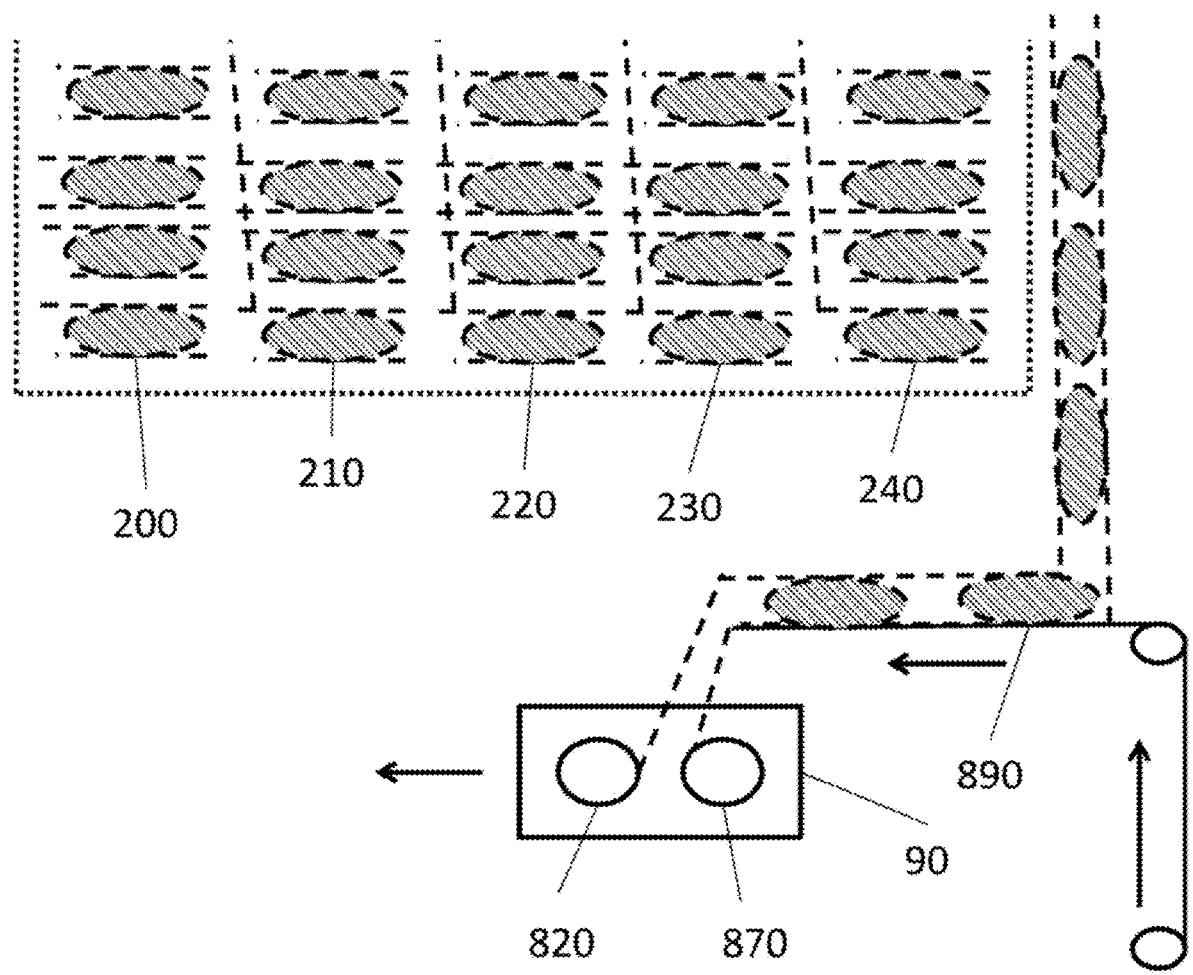

As illustrated in FIG. 43, as the delamination trolley 90 travels along a portion of the vertical grill in the direction of the horizontal arrows, the diverter 890 travels in the direction of the horizontal arrows. The movement of the delamination trolley 90 in the direction of the horizontal arrows of FIG. 43 and/or the delamination process associated with FIG. 43, causes more laminated food product to be pulled from the removable food module. This laminated food is supported by the diverter 890 so that the laminated food product is kept from falling upon the vertical grill system as the delamination trolley 90 traverses the vertical grill system.

Figure 44:
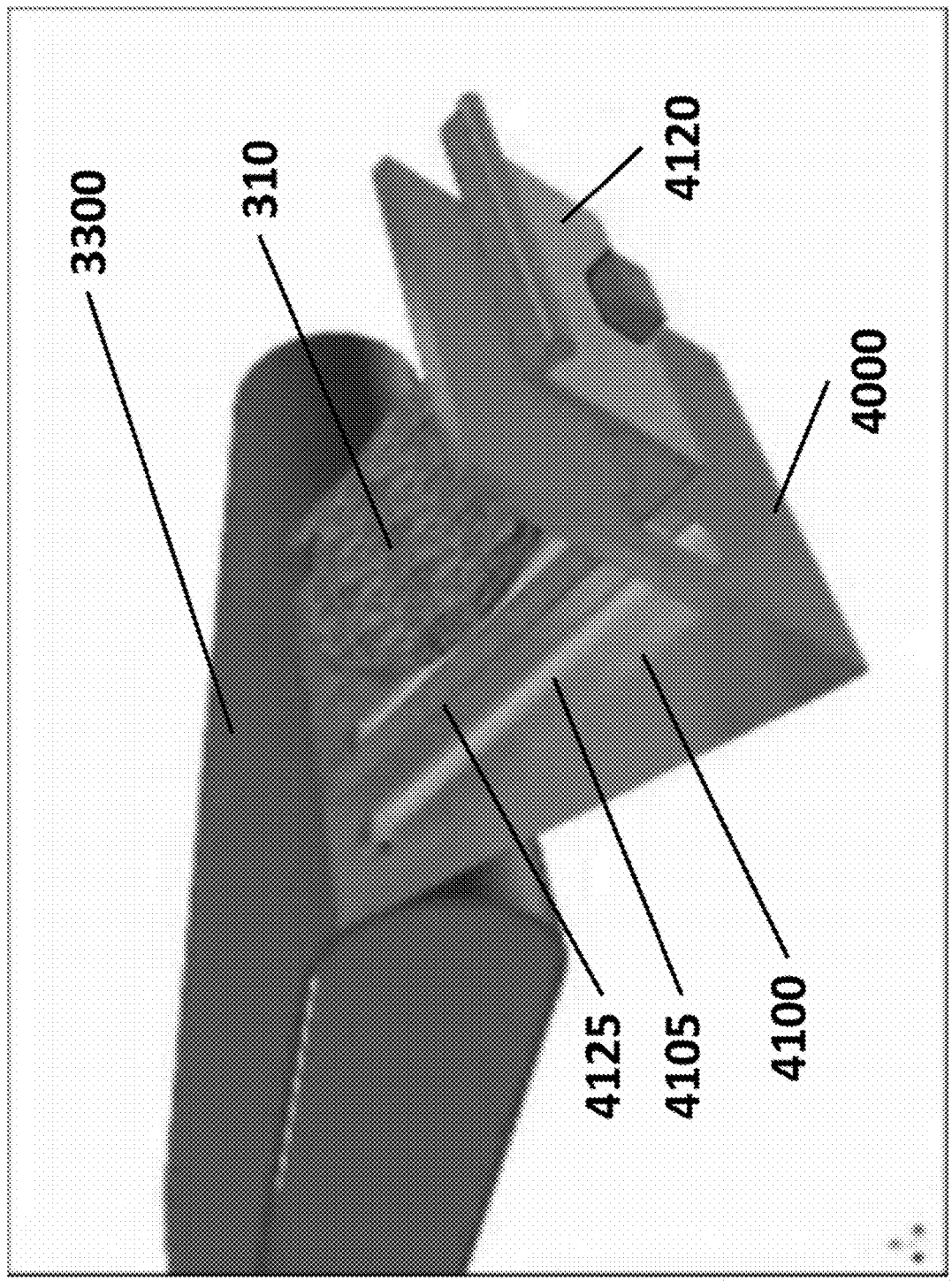
FIG. 44 through FIG. 52 illustrate a staging bin for the vertical grill of FIGS. 16 and 17.

FIG. 44 illustrates the first-in-first-out (FIFO) staging bin 4000. The FIFO staging bin 4000 is located at one end of a conveyor 3300. The FIFO staging bin 4000 includes a fork 4120 for lifting the cooked product 310. The FIFO staging bin 4000 has two product surfaces, wherein one product surface 4100 has grooves or channels 4105 that correspond to the prongs 4125 of the fork 4120. As illustrated in FIG. 44, the fork 4120 has, thereon, two individual cooked products and the fork 4120 is positioned above the FIFO staging bin product surface 4100 having grooves 4105.

Figure 45:
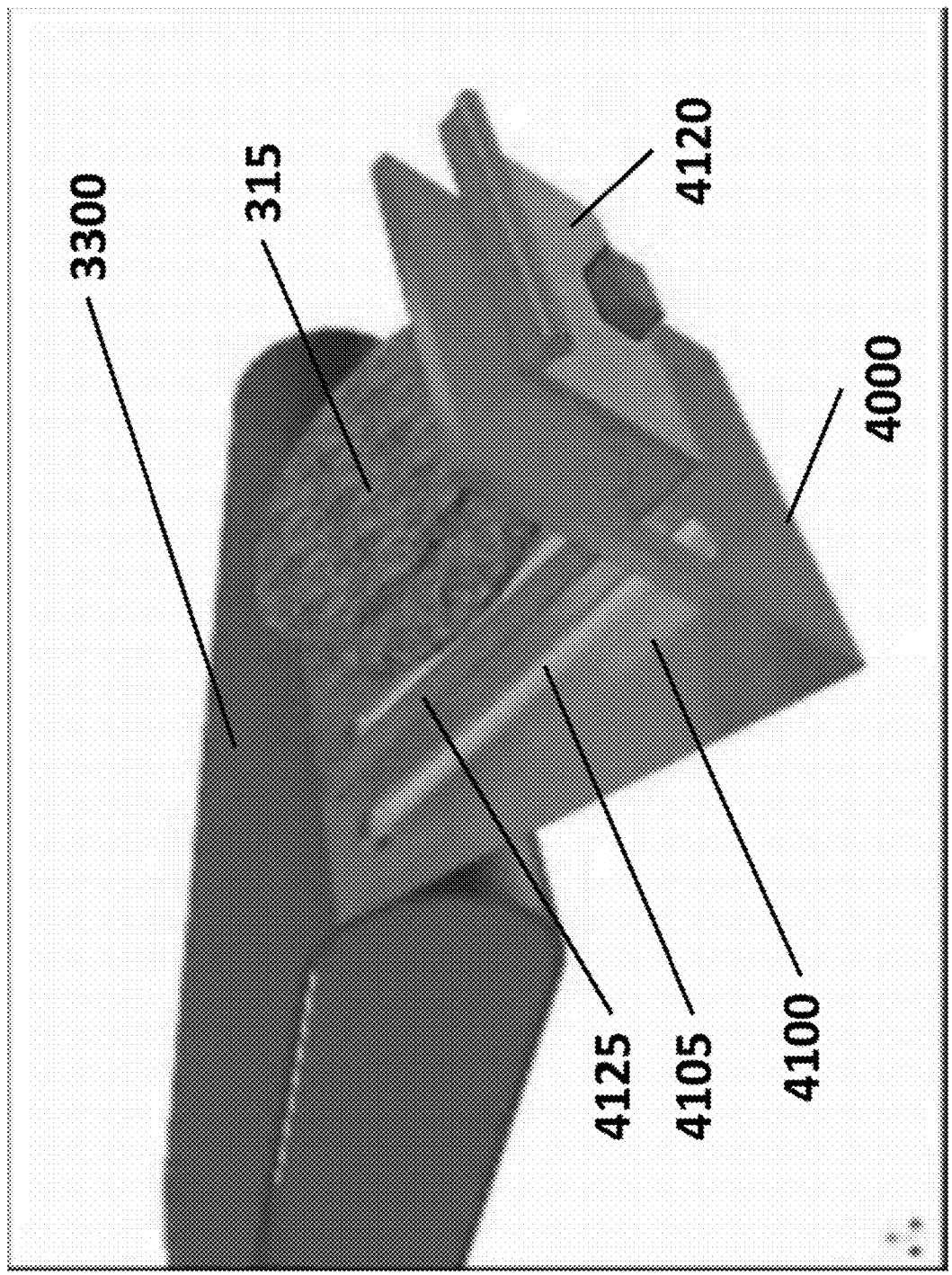
Figure 46:
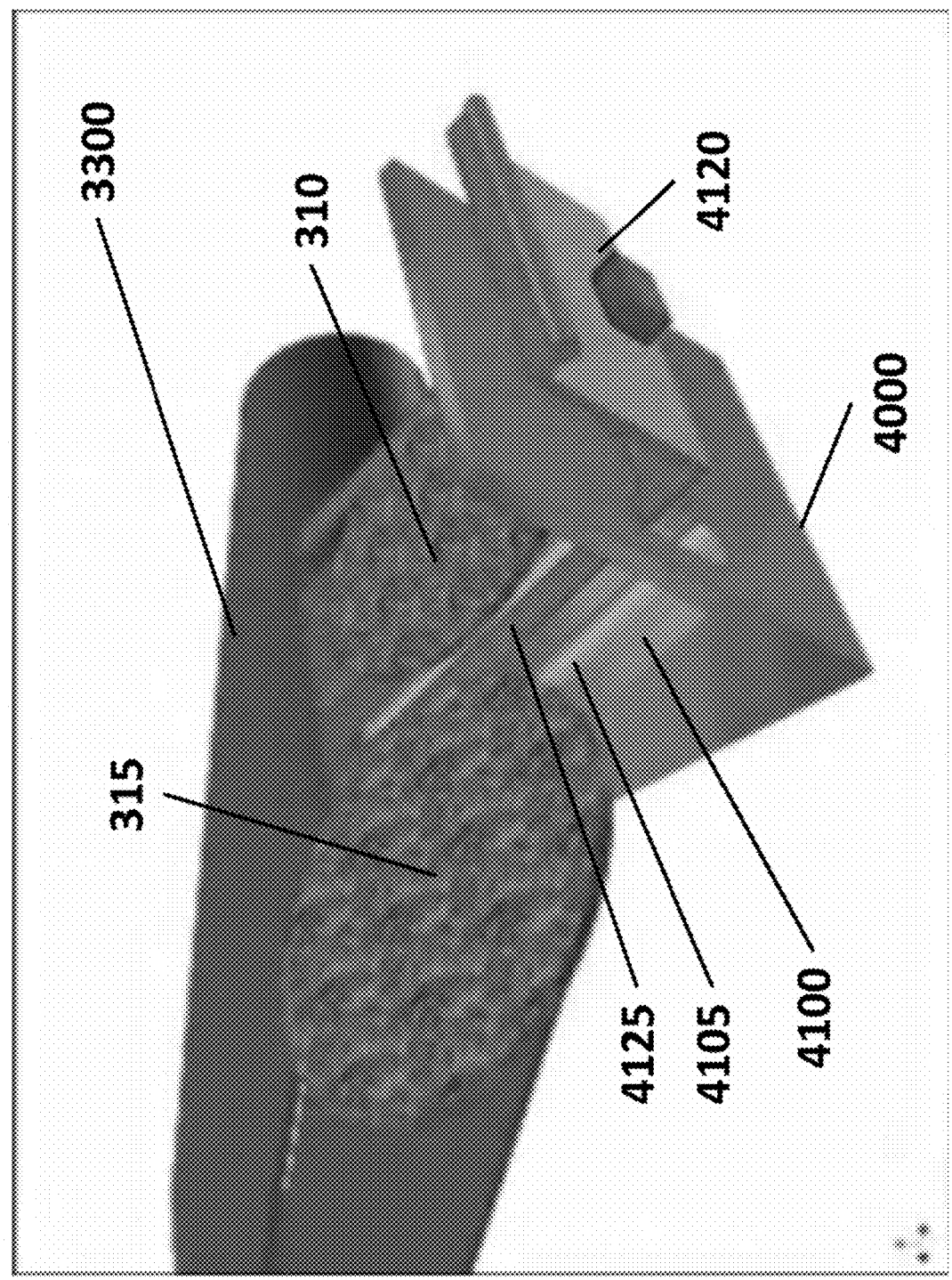

FIGS. 45 and 46 illustrate that the first in cooked product 315 (product on the top of the stacked cooked products) is removed from the FIFO staging bin 4000.

Figure 47:
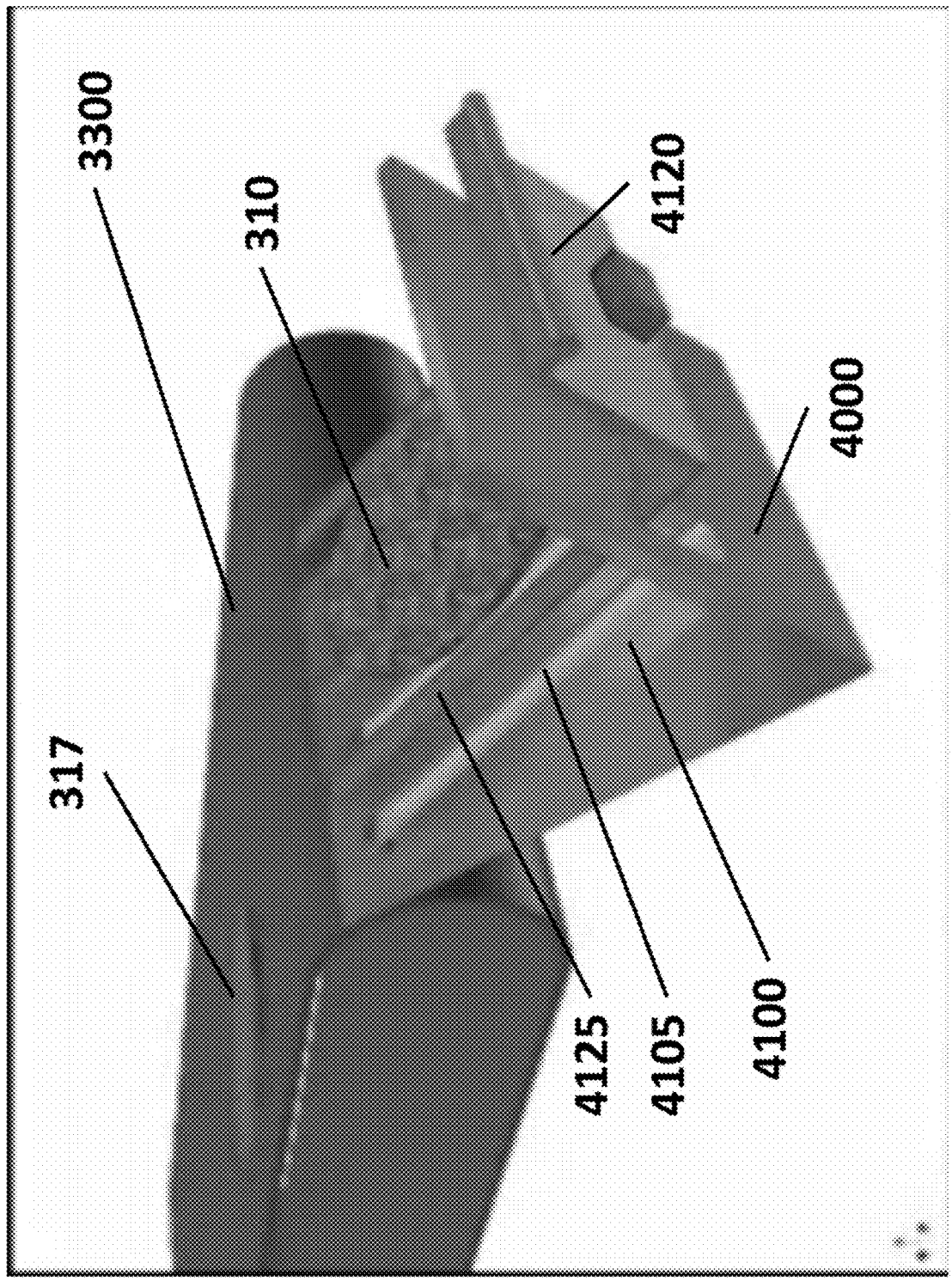
Figure 48:
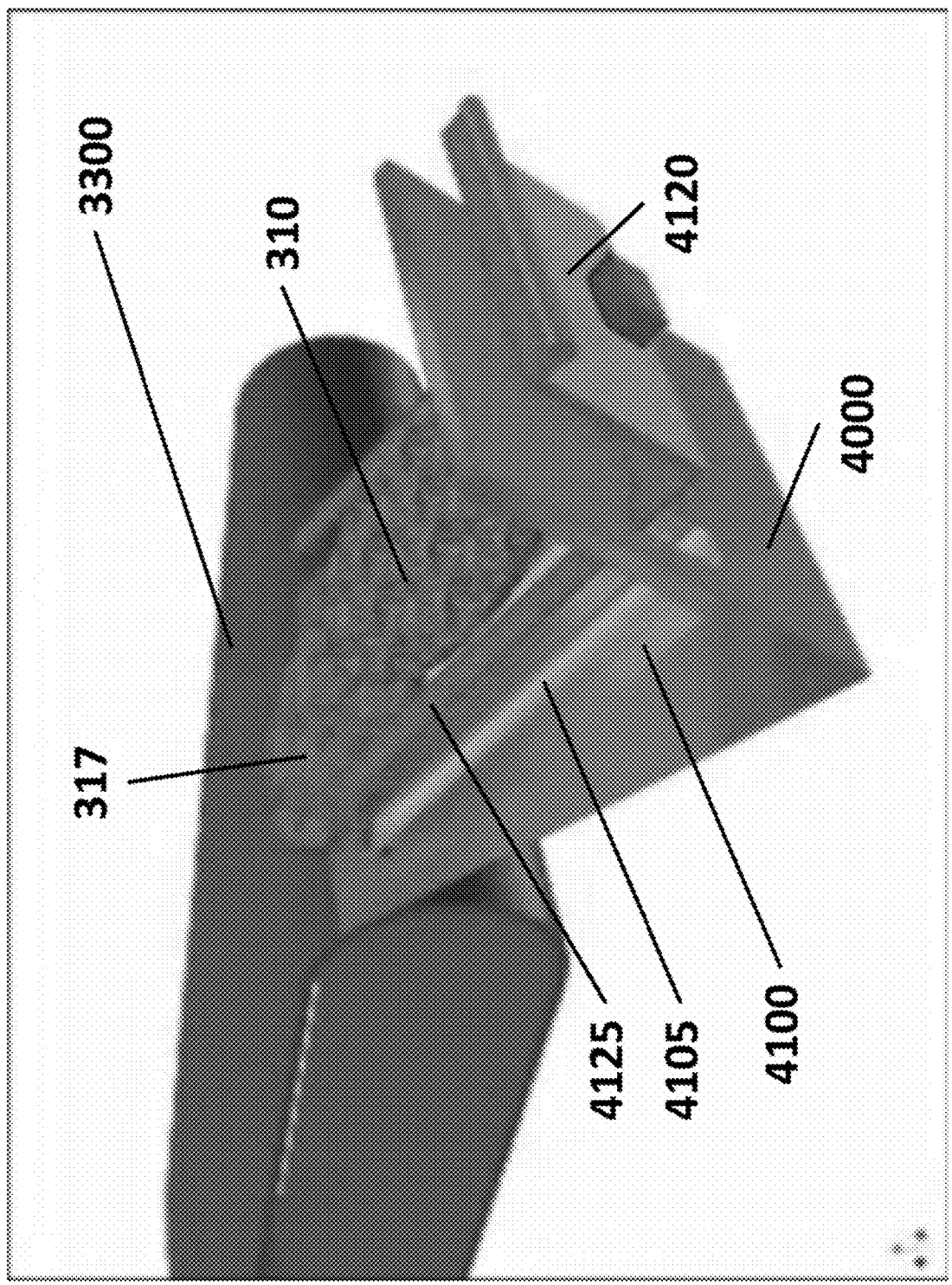

As illustrated in FIGS. 47 and 48, the fork 4120 is positioned above the FIFO staging bin product surface 4100 having grooves 4105 to allow the next cooked product 317 on the conveyor 3300 to be placed beneath the stack of cooked products 310 located on the fork 4120.

Figure 49:
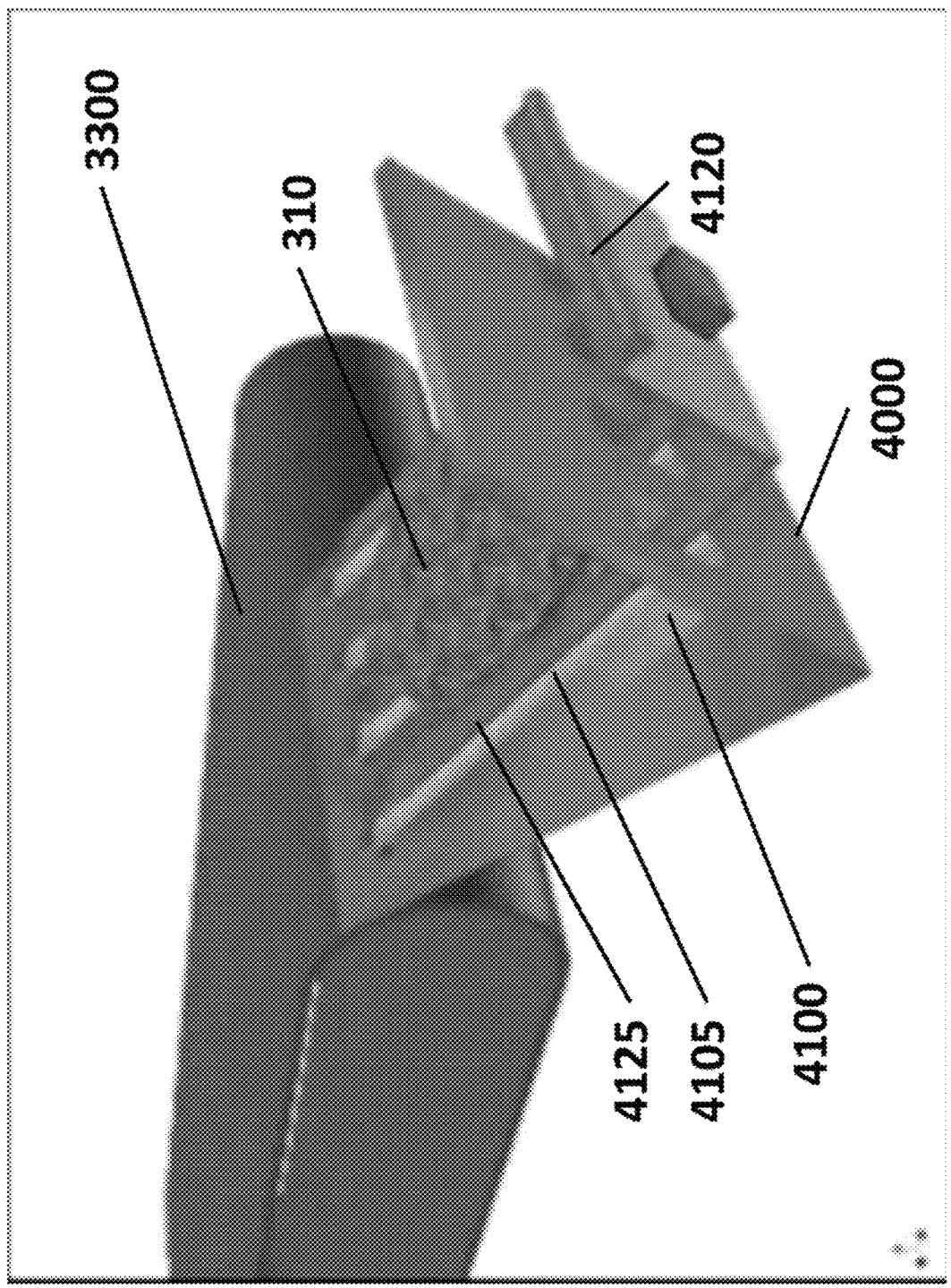

FIG. 49 illustrates the fork 4120 being lowered until a bottom surface of the prongs 4125 of the fork 4120 contacts the cooked product 317 on the FIFO staging bin product surface 4100 having grooves 4105.

Figure 50:
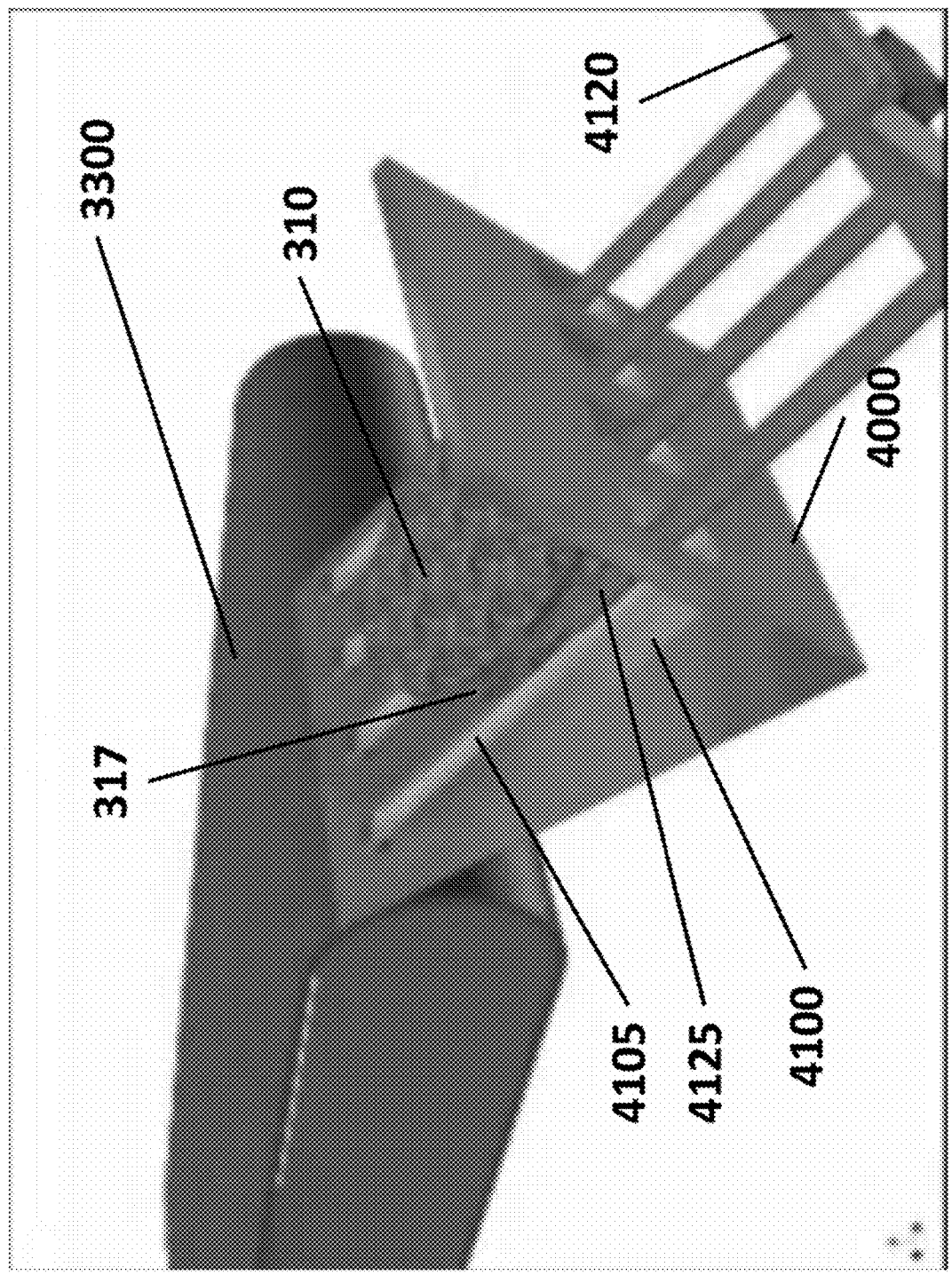
Figure 51:
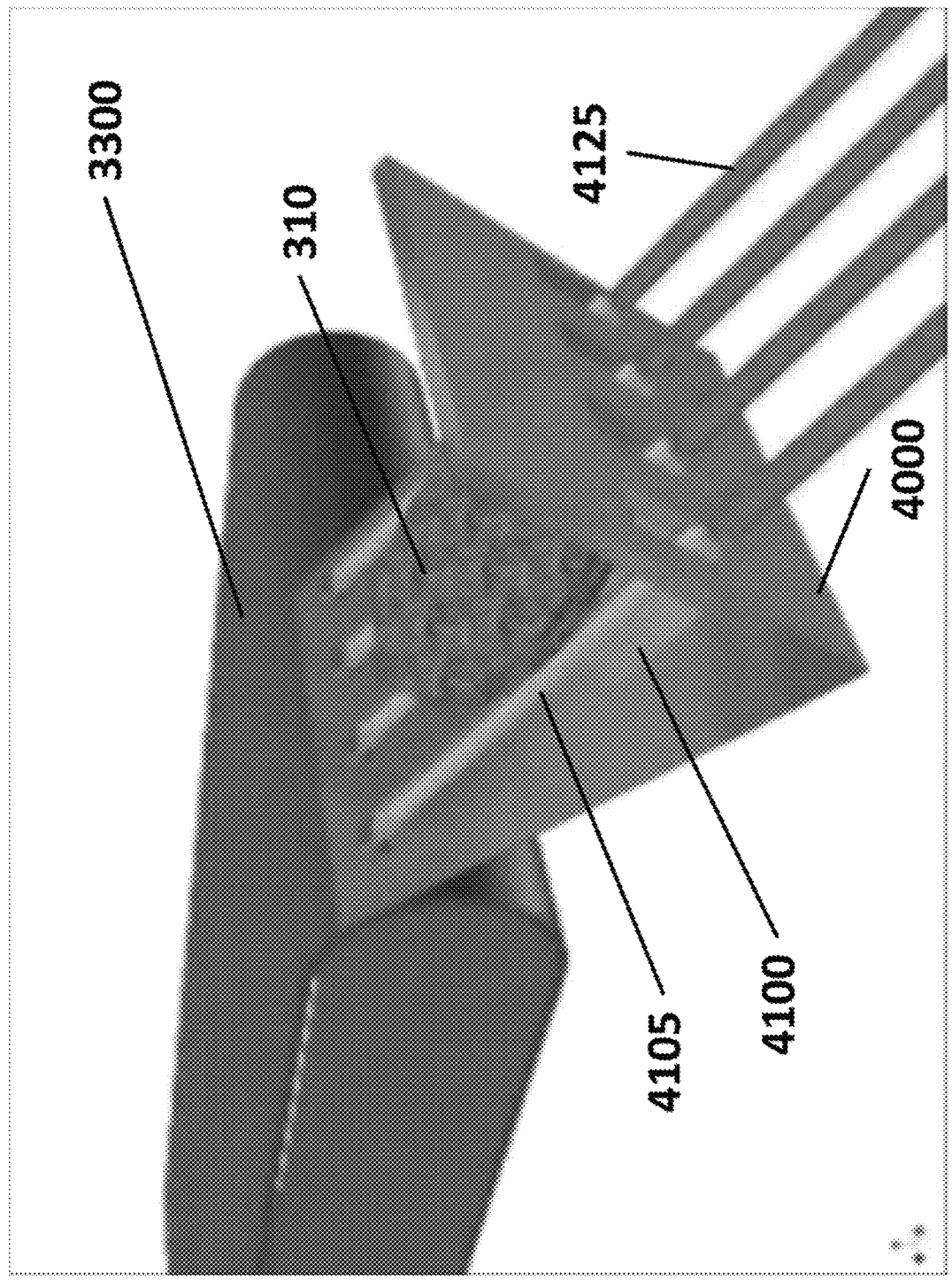

FIGS. 50 and 51 illustrate after the fork 4120 being lowered until a bottom surface of the prongs 4125 of the fork 4120 contacts the cooked product 317 on the FIFO staging bin product surface 4100 having grooves 4105, the fork 4120 is removed from the FIFO staging bin 4000 so that the stack cooked product 310 on the prongs 4125 of the fork 4120 is stacked onto the cooked product 317 on the FIFO staging bin product surface 4100 having grooves 4105.

Figure 52:
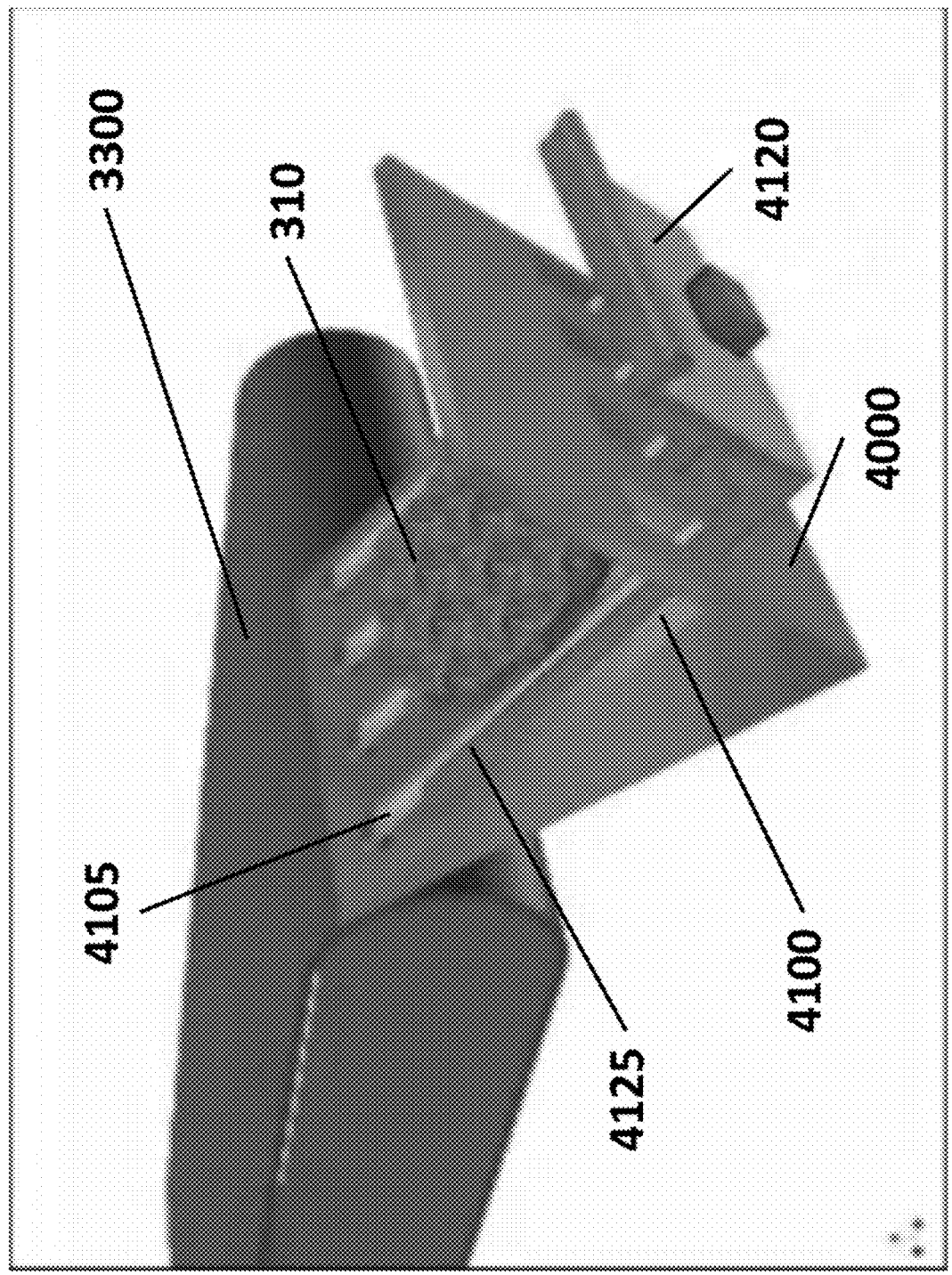

FIG. 52 illustrates the fork 4120 being inserted into the FIFO staging bin 4000 so that the prongs 4125 of the fork 4120 travel in the grooves 4105 of the product surface 4100 having grooves 4105. This enables the fork 4120 to be placed beneath the newly formed stack of cooked products 310 so that the newly formed stack of cooked products 310 can be properly lifted to allow the next cooked product to be placed at the bottom of the stacked cooked product 310.

In summary, an automated cooking system includes a food storage unit having laminated food product therein; a food dispensing unit; a vertical cooking system; a conveyor; and a staging bin; the vertical cooking system including multiple first heating plates and multiple movable second heating plates forming multiple cooking units, a first heating plate and a corresponding movable second heating plate forming a cooking unit; the food dispensing unit including a delamination trolley; the delamination trolley including a delamination unit for receiving laminated food product from the food storage unit and delaminating the received laminated food product; the delamination trolley moving horizontally above the vertical cooking system to position the delamination unit over a cooking unit of the vertical cooking system; the delamination unit delaminating the laminated food product into a volume between the first heating plate and the movable second heating plate of the cooking unit of the vertical cooking system; the cooking unit of the vertical cooking system cooking the food product by moving the movable second heating plate towards the first heating plate and applying heat to the food product through the movable second heating plate and the first heating plate; the cooking unit of the vertical cooking system releasing the cooked food product, to fall upon the conveyor, by moving the movable second heating plate away from the first heating plate; the conveyor conveying the cooked product from the cooking unit of the vertical cooking system to the staging bin.

The staging bin may be a first-in-first-out bin so that a first placed cooked product is a first cooked product to be removed from the staging bin.

The food storage unit may include an inversion curve to enable the laminated food product to travel downwardly towards the food dispensing unit located over the vertical cooking system.

The food dispensing unit may include a diverter that travels in conjunction with travel of the delamination trolley, the diverter preventing laminated food product from falling upon the vertical cooking system as the delamination trolley traverses the vertical cooking system.

The staging bin may be located at an end of the conveyor to receive the cooked food product; the staging bin having a cooked food product receiving surface and a fork having prongs; the food product receiving surface having channels therein to receive the prongs of the fork.

The food storage unit may include a removable food module having laminated food product therein.

An automated cooking method includes (a) placing laminated food product in a food storage unit; (b) transporting the laminated food product from the food storage unit to a food dispensing unit located over a vertical cooking system having a plurality of cooking unit, each cooking unit having a first heating plate and a movable second heating plate; (c) positioning the food dispensing unit over a first cooking unit; (d) delaminating a first laminated food product into the first cooking unit; (e) cooking the delaminated first food product between the first heating plate and the movable second heating plate of the first cooking unit; (f) releasing the cooked first food product onto a conveyor; (g) conveying the cooked first food product from the first cooking unit to a staging bin; and (h) receiving the cooked first food product in the staging bin.

The automated cooking method may further include (i) positioning the food dispensing unit over a second cooking unit; (j) delaminating a second laminated food product into the second cooking unit; (k) cooking the delaminated second food product between the first heating plate and the movable second heating plate of the second cooking unit; (l) releasing the cooked second food product onto a conveyor; (m) conveying the cooked second food product from the second cooking unit to the staging bin; (n) lifting, using a fork, the cooked first food product in the staging bin; (o) receiving the cooked second food product under the lifted first food product in the staging bin; and (p) placing, using the fork, the lifted first food product onto the received cooked second food product.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. An automated cooking system comprising:
a food storage unit having laminated food product therein;
a food dispensing unit;
a vertical cooking system;
a conveyor; and
a staging bin;
said vertical cooking system including multiple first heating plates and multiple movable second heating plates forming multiple cooking units, a first heating plate and a corresponding movable second heating plate forming a cooking unit;
said food dispensing unit including a delamination trolley;
said delamination trolley including a delamination unit for receiving laminated food product from said food storage unit and delaminating the received laminated food product;
said delamination trolley moving horizontally above said vertical cooking system to position said delamination unit over a cooking unit of said vertical cooking system;
said delamination unit delaminating the laminated food product into a volume between said first heating plate and said movable second heating plate of said cooking unit of said vertical cooking system;
said cooking unit of said vertical cooking system cooking the food product by moving said movable second heating plate towards said first heating plate and applying heat to said food product through said movable second heating plate and said first heating plate;
said cooking unit of said vertical cooking system releasing the cooked food product, to fall upon said conveyor, by moving said movable second heating plate away from said first heating plate;

said conveyor conveying the cooked product from said cooking unit of said vertical cooking system to said staging bin.

2. The automated cooking system as claimed in claim 1, wherein said staging bin is a first-in-first-out bin so that a first placed cooked product is a first cooked product to be removed from said staging bin.

3. The automated cooking system as claimed in claim 1, wherein said food storage unit includes an inversion curve to enable the laminated food product to travel downwardly towards said food dispensing unit located over said vertical cooking system.

4. The automated cooking system as claimed in claim 1, wherein said food dispensing unit includes a diverter that travels in conjunction with travel of said delamination trolley, said diverter preventing laminated food product from falling upon said vertical cooking system as said delamination trolley traverses said vertical cooking system.

5. The automated cooking system as claimed in claim 1, wherein said staging bin is located at an end of said conveyor to receive the cooked food product;

said staging bin having a cooked food product receiving surface and a fork having prongs;

said food product receiving surface having channels therein to receive said prongs of said fork.

6. The automated cooking system as claimed in claim 1, wherein said food storage unit includes a removable food module having laminated food product therein.

7. An automated cooking method, comprising:
(a) placing laminated food product in a food storage unit;
(b) transporting the laminated food product from the food storage unit to a food dispensing unit located over a vertical cooking system having a plurality of cooking units, each cooking unit having a first heating plate and a movable second heating plate;
(c) positioning the food dispensing unit over a first cooking unit;
(d) delaminating a first laminated food product into the first cooking unit;
(e) re-positioning the food dispensing unit over a second cooking unit;
(f) delaminating a second laminated food product into the second cooking unit;
(g) cooking the delaminated first food product between the first heating plate and the movable second heating plate of the first cooking unit;
(h) releasing the cooked first food product onto a conveyor;
(i) conveying the cooked first food product from the first cooking unit to a staging bin;
(j) receiving the cooked first food product in the staging bin; and
(k) cooking the delaminated second food product between the first heating plate and the movable second heating plate of the second cooking unit.

8. The automated cooking method as claimed in claim 7, further comprising:
(l) releasing the cooked second food product onto a conveyor;
(m) conveying the cooked second food product from the second cooking unit to the staging bin;
(n) lifting, using a fork, the cooked first food product in the staging bin;
(o) receiving the cooked second food product under the lifted first food product in the staging bin; and
(p) placing, using the fork, the lifted first food product onto the received cooked second food product.

* * * * *